(12) United States Patent
Lim et al.

(10) Patent No.: US 11,064,201 B2
(45) Date of Patent: Jul. 13, 2021

(54) METHOD AND DEVICE FOR IMAGE ENCODING/DECODING BASED ON EFFECTIVE TRANSMISSION OF DIFFERENTIAL QUANTIZATION PARAMETER

(71) Applicant: KAONMEDIA CO., LTD., Seongnam-si (KR)

(72) Inventors: Jeong Yun Lim, Seoul (KR); Hoa Sub Lim, Seongnam-si (KR); Dong Gyu Sim, Seoul (KR); Sea Nae Park, Uijeongbu-si (KR)

(73) Assignee: KAONMEDIA CO., LTD., Seongnam-si (KR)

( * ) Notice: Subject to any disclaimer, the term of this patent is extended or adjusted under 35 U.S.C. 154(b) by 0 days.

(21) Appl. No.: 16/645,220

(22) PCT Filed: Sep. 6, 2018

(86) PCT No.: PCT/KR2018/010430
§ 371 (c)(1),
(2) Date: Mar. 6, 2020

(87) PCT Pub. No.: WO2019/050300
PCT Pub. Date: Mar. 14, 2019

(65) Prior Publication Data
US 2020/0296374 A1    Sep. 17, 2020

(30) Foreign Application Priority Data

Sep. 6, 2017  (KR) .................. 10-2017-0113889

(51) Int. Cl.
*H04N 19/124* (2014.01)
*H04N 19/119* (2014.01)
(Continued)

(52) U.S. Cl.
CPC .......... *H04N 19/124* (2014.11); *H04N 19/119* (2014.11); *H04N 19/147* (2014.11); *H04N 19/176* (2014.11); *H04N 19/96* (2014.11)

(58) Field of Classification Search
CPC .. H04N 19/124; H04N 19/119; H04N 19/147; H04N 19/176; H04N 19/96
(Continued)

(56) References Cited

U.S. PATENT DOCUMENTS 10,516,885 B1* 12/2019 Li ........................ H04N 19/124
                                                                  375/240.03
2012/0288007 A1* 11/2012 Lee ..................... H04N 19/176
                                                                  375/240.16
(Continued)

FOREIGN PATENT DOCUMENTS

JP    2017-153137 A    8/2017
KR  10-2013-0045807 A  5/2013
(Continued)

*Primary Examiner* — Marnie A Matt
(74) *Attorney, Agent, or Firm* — Novick, Kim & Lee, PLLC; Sang Ho Lee

(57) ABSTRACT

A method for image decoding includes: a step of parsing division depth information and division direction information of a block to be decoded; a step of acquiring division structure information, of a unit to be decoded in the block, corresponding to the parsed division depth information and division direction information; a step of acquiring, based on the division structure information, one or more prediction quantization parameters from at least one neighboring unit corresponding to the unit to be decoded; a step of acquiring a differential quantization parameter for the unit to be decoded; a step of acquiring a quantization parameter from the differential quantization parameter and the one or more prediction quantization parameters; and a step of performing
(Continued)

decoding corresponding to the unit to be decoded, by using the acquired quantization parameter.

10 Claims, 23 Drawing Sheets

(51) Int. Cl.
*H04N 19/147* (2014.01)
*H04N 19/176* (2014.01)
*H04N 19/96* (2014.01)

(58) Field of Classification Search
USPC .................................................. 375/240.03
See application file for complete search history.

(56) References Cited

U.S. PATENT DOCUMENTS

| | | | |
|---|---|---|---|
| 2013/0064299 A1* | 3/2013 | Fukushima | H04N 19/119 375/240.16 |
| 2013/0071039 A1* | 3/2013 | Sato | H04N 19/176 382/251 |
| 2013/0266233 A1* | 10/2013 | Kondo | G06T 9/008 382/233 |
| 2014/0205007 A1* | 7/2014 | Takahashi | H04N 19/50 375/240.03 |
| 2014/0226719 A1* | 8/2014 | Yamamoto | H04N 19/91 375/240.12 |
| 2014/0376621 A1* | 12/2014 | Fukushima | H04N 19/196 375/240.03 |
| 2016/0142710 A1* | 5/2016 | Li | H04N 19/119 382/233 |
| 2016/0191941 A1* | 6/2016 | Oh | H04N 19/91 375/240.16 |
| 2017/0195671 A1* | 7/2017 | Choi | H04N 19/61 |
| 2018/0041776 A1* | 2/2018 | Kim | H04N 19/157 |
| 2020/0296374 A1* | 9/2020 | Lim | H04N 19/176 |

FOREIGN PATENT DOCUMENTS

| | | |
|---|---|---|
| KR | 10-2014-0073472 A | 6/2014 |
| KR | 10-2014-0074349 A | 6/2014 |
| KR | 10-2016-0113082 A | 9/2016 |

* cited by examiner

FIG. 5

| | Descriptor |
|---|---|
| coding_quadtree (x0, y0, log2Cbsize, cqtDepth){ | |
| if(x0 + (1 << log2CbSize) <= pic_width_in_luma_samples &&<br>y0 + (1 << log2CbSize) <= pic_height_in_luma_samples &&<br>log2CbSize > MinCbLog2SizeY){ | |
| *split_cu_flag[x0][y0]* | ae(v) |
| *binary_split_flag[x0][y0]* | |
| *binary_depth[x0][y0]* | |
| } | |
| ... | |
| *if(binary_split_flag[x0][y0]){* | |
| *Binary_split_mode // or Binary_split_ver, Binary_split_hor* | |
| *}* | |
| if(split_cy_flag[x0][y0]){ | |
| x1 = x0 + (1 << (log2CbSize − 1)) | |
| y1 = y0 + (1 << (log2CbSize − 1)) | |
| *coding_quadtree*(x0, y0, log2CbSize − 1, cqtDepth+1) | |
| if(x1 < pic_width_in_luma_samples) | |
| *coding_quadtree*(x1, y0, log2CbSize − 1, cqtDepth +1) | |
| if(y1 < pic_height_in_luma_samples) | |
| *coding_quadtree*(x0, y1, log2CbSize − 1, cqtDepth + 1) | |
| if(x1 < pic_width_in_luma_samples && y1 < pic_height_in_luma_sampels) | |
| *coding_quadtree*(x1, y1, log2CbSize − 1, cqtDepth + 1) | |
| } else if (binary_depth == 0){ | |
| *coding_unit* (x0, y0, log2CbSize) | |
| } else | |
| *coding_binarytree* (x0, y0, log2Cbsize, cqtDepth, binary_depth<br>/* Binary_split_flag*/) | |
| } | |

FIG. 10

METHOD AND DEVICE FOR IMAGE ENCODING/DECODING BASED ON EFFECTIVE TRANSMISSION OF DIFFERENTIAL QUANTIZATION PARAMETER

TECHNICAL FIELD

The present invention relates to image coding and decoding techniques in a high picture quality video compression method and apparatus and, more particularly, to a method and apparatus for effectively transmitting a difference quantization parameter, calculating an actual quantization parameter based on the transmitted difference quantization parameter, and performing dequantization based on the actual quantization parameter.

BACKGROUND ART

In an image compression method, a picture is divided into a plurality of blocks each having a predetermined size, and coding is performed. In addition, inter prediction and intra prediction techniques for eliminating redundancy between pictures are used to increase compression efficiency.

In this case, intra prediction and inter prediction are used to generate a residual signal. The reason why the residual signal is generated is that a compression ratio is increased because the amount of data is small when coding is performed using the residual signal and that a value of the residual signal is small as prediction becomes better.

In the intra prediction method, the data of a current block is predicted using pixels neighboring the current block. A difference between an actual value and a predicted value is called a residual signal block. In the case of HEVC, in an intra prediction method, 9 prediction modes used in the existing H.264/AVC are increased to 35 prediction modes, and prediction is more subdivided and performed.

In the case of the inter prediction method, the most similar block is found by comparing a current block with blocks within neighboring pictures. In this case, position information (Vx, Vy) of the found block is referred to as a motion vector. Furthermore, a difference between pixel values within a block between the current block and a prediction block predicted by the motion vector is called a residual signal block (motion-compensated residual block).

As described above, the amount of data in a residual signal is reduced because intra prediction and inter prediction are further subdivided, but a computational load of video processing has greatly increased.

Particularly, there is a difficulty in a pipeline implementation due to an increase in the complexity in a process of determining a division structure within a picture for image coding and decoding, and a conventional block division method and the size of a block divided accordingly may not be suitable for the coding of a high resolution image.

Furthermore, a quantization processing process based on a current block structure may be inefficient due to the processing of an ultra-high resolution image for supporting the virtual reality, such as a 360 VR image, and the processing of various division structures accompanied by the processing of the ultra-high resolution image.

DISCLOSURE

Technical Problem

The present invention has been made to solve the aforementioned problems, and an object of the present invention is to provide an image processing method for being suitable for the coding and decoding of a high resolution image and processing a more efficient quantization process based on a change in the complex coding characteristic, and an image coding and decoding method using the same.

Particularly, in the case of full high definition (FHD) and ultra high definition (HHD), forward video, it is effective to perform a size on a basic coding unit in various ways for coding efficiency because the video has very high resolution. Accordingly, quantization parameter information that affects coding efficiency is also transmitted at various levels. The corresponding information is additional information. Accordingly, for coding efficiency, it is effective to code and transmit the corresponding information in a greater block.

However, if quantization is performed in a great block unit, performance of an apparatus may be degraded from the viewpoint of rate control or objective or subjective picture quality. Accordingly, there is a need for the quantization parameter transmission of a proper unit.

Technical Solution

An image decoding method according to an embodiment of the present invention includes parsing division depth information and division direction information of a block to be decoded, obtaining division structure information of a unit to be decoded within the block corresponding to the parsed division depth information and division direction information, obtaining one or more prediction quantization parameters from at least one neighboring unit corresponding to the unit to be decoded based on the division structure information, obtaining a difference quantization parameter of the unit to be decoded, obtaining a quantization parameter from the difference quantization parameter and the one or more prediction quantization parameters, and performing decoding corresponding to the unit to be decoded using the obtained quantization parameter.

Advantageous Effects

According to an embodiment of the present invention, a coding unit, that is, a basic unit by which inter prediction or intra prediction is performed, may be divided in a complex tree structure including a quad tree, a binary tree and a ternary tree. A quantization parameter based on the quantization process of a target block is adaptively determined based on group quantization information of the target block. Accordingly, quantization efficiency corresponding to a multi-changed block form can be enhanced, and coding efficiency for a high resolution image can be enhanced.

Furthermore, according to an embodiment of the present invention, motion compensation efficiency and a filtering effect corresponding to a multi-changed block form can be enhanced and coding efficiency for a high resolution image can be enhanced because a process of deriving a quantization parameter and the derived quantization parameter are adaptively selected and determined using subdivided characteristic information of an image.

Particularly, according to the present invention, transmission efficiency of a quantization parameter can be enhanced and precise rate-control is made possible through a method of transmitting difference quantization parameters in unit units having various sizes.

DESCRIPTION OF DRAWINGS

FIGS. 2 to 5 are diagrams for describing a first embodiment of a method of dividing and processing an image in a block unit.

FIG. 10 is a diagram illustrating an embodiment of a syntax structure used to divide an image in a block unit and processing the image.

MODE FOR INVENTION

Hereinafter, embodiments of the present invention will be described in detail with reference to the drawings. In the following description of the embodiments of the present invention, a detailed description of known functions and configurations incorporated herein will be omitted when it may make the subject matter of the present disclosure rather unclear It is to be understood that when an element is referred to as being "connected" or "connected" to another element, it may be directly connected or connected to the other element. In addition, the description of a specific configuration in the present invention does not exclude a configuration other than the configuration, and means that additional configurations can be included in the scope of the present invention or the scope of the present invention.

The terms first, second, etc. may be used to describe various elements, but the elements should not be limited by the terms. The terms are used only for the purpose of distinguishing one component from another. For example, the first component may be referred to as a second component without departing from the scope of the present invention. Likewise, the second component may also be referred to as a first component.

In addition, the components shown in the embodiments of the present invention are shown independently to represent different characteristic functions, which do not mean that each component is composed of separate hardware or software constituent units. That is, each constituent unit is included in each constituent unit for convenience of explanation, and at least two constituent units of the constituent units may be combined to form one constituent unit, or one constituent unit may be divided into a plurality of constituent units to perform a function. The integrated embodiments and the separate embodiments of the components are also included within the scope of the present invention, unless they depart from the essence of the present invention.

In addition, some of the elements are not essential elements for performing essential functions in the present invention, but may be optional elements for improving performance. The present invention can be implemented only with components essential for realizing the essence of the present invention except for the components used for performance enhancement, and can be implemented with only the essential components except for optional components used for performance improvement are also included in the scope of the present invention.

Figure 1:
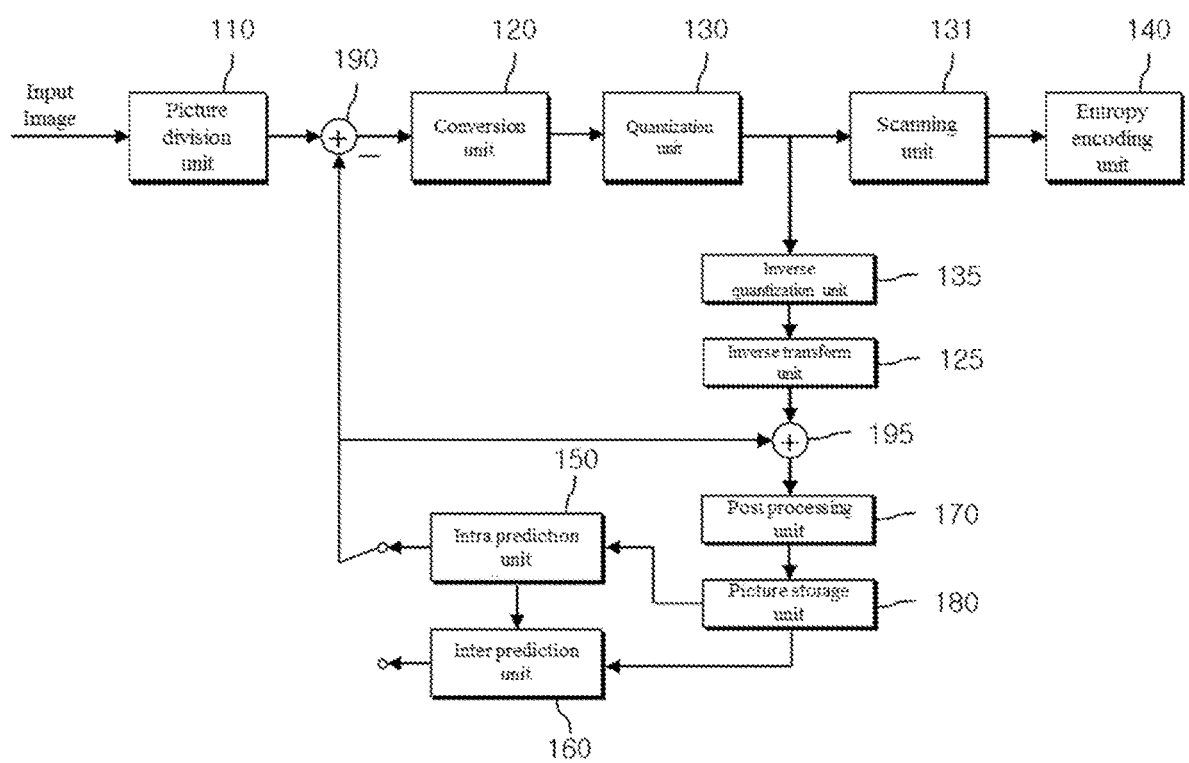
FIG. 1 is a block diagram showing the configuration of an image coding apparatus according to an embodiment of the present invention.

FIG. 1 is a block diagram illustrating a configuration of an image encoding apparatus according to an exemplary embodiment of the present invention. The image encoding apparatus 10 includes a picture division unit 110, a transform unit 120, a quantization unit 130, a scanning unit 131, an entropy encoding unit 140, an intra prediction unit a prediction unit 150, an inter prediction unit 160, an inverse quantization unit 135, an inverse transform unit 125, a post processing unit 170, a picture storage unit 180, a subtraction unit 190, and an adder 195.

Referring to FIG. 1, the picture division unit 110 analyzes an input video signal, divides a picture into a plurality of coding units to determine a prediction mode, and determines a size of a prediction unit for each coding unit.

The picture division unit 110 forwards an encoding target prediction unit to the intra prediction unit 150 or the inter prediction unit 160 according to the prediction mode (or a prediction method). The picture division unit 110 also forwards the encoding target prediction unit to the subtraction unit 190.

Here, the picture of the image is composed of a plurality of slices, and the slice may be divided into a plurality of coding tree units CTU, which is a basic unit for dividing the picture.

The coding tree unit may be divided into one or two or more coding units CUs, which are basic units for performing the inter prediction or the intra prediction.

The coding unit CU may be divided into one or more prediction units PU, which are basic units on which prediction is performed.

In this case, the coding apparatus 10 determines one of the inter prediction and the intra prediction as a prediction method for each of the divided coding units CUs, but it is differently generated for each prediction unit PU.

On the other hand, the coding unit CU may be divided into one or two or more transform units TUs, which are basic units in which a transform for a residual block is performed.

In this case, the picture division unit 110 may forward the image data to the subtraction unit 190 through the divided block unit (for example, the prediction unit PU or the transform unit TU 190).

Figure 2:
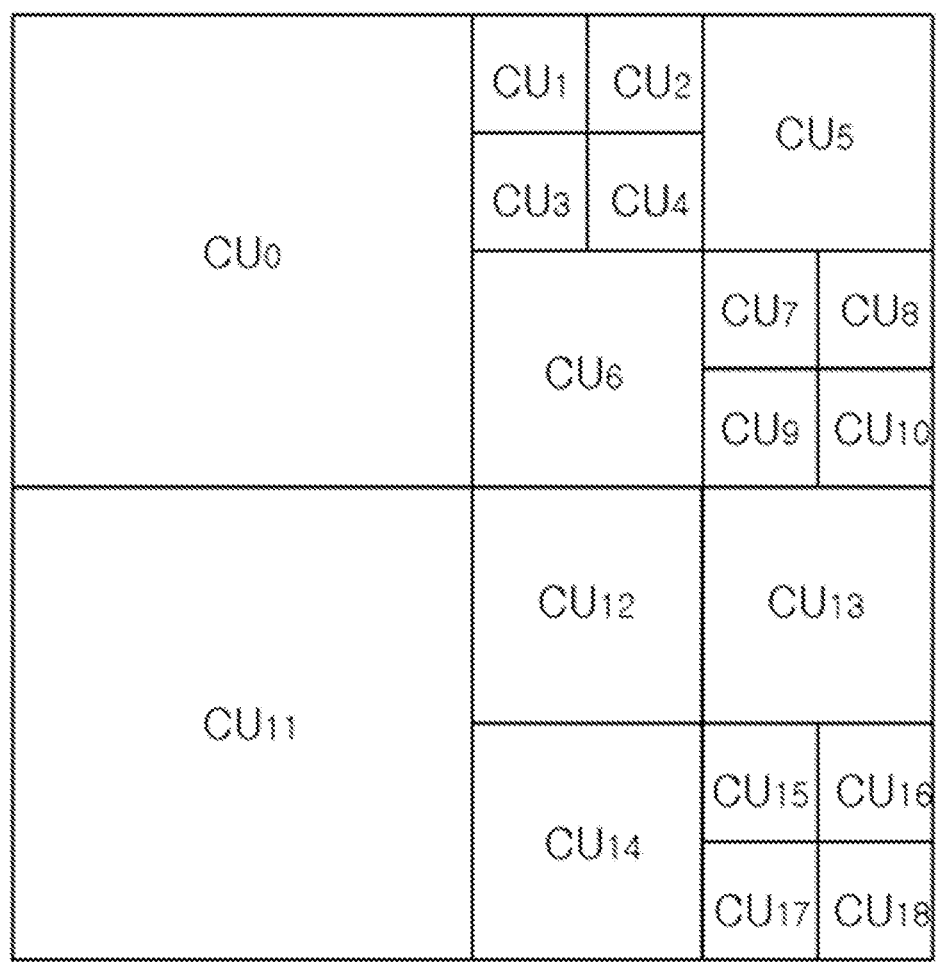

Referring to FIG. 2, the coding tree unit CTU having a maximum size of 256×256 pixels is divided into a quad tree structure and then divided into four coding units CUs having a square shape.

Each of the four coding units CUs having the square shape can be divided into a quad tree structure, and the depth of the coding unit CU divided into the quad tree structure may have an integer value from 0 to 3.

The coding unit CU may be divided into one or more prediction units PU according to the prediction mode.

In the case of the intra prediction mode, when the size of the coding unit CU is 2N×2N, the prediction unit PU can have the size of 2N×2N shown in FIG. 3A or the size of N×N shown in FIG. 3B.

Figure 4:
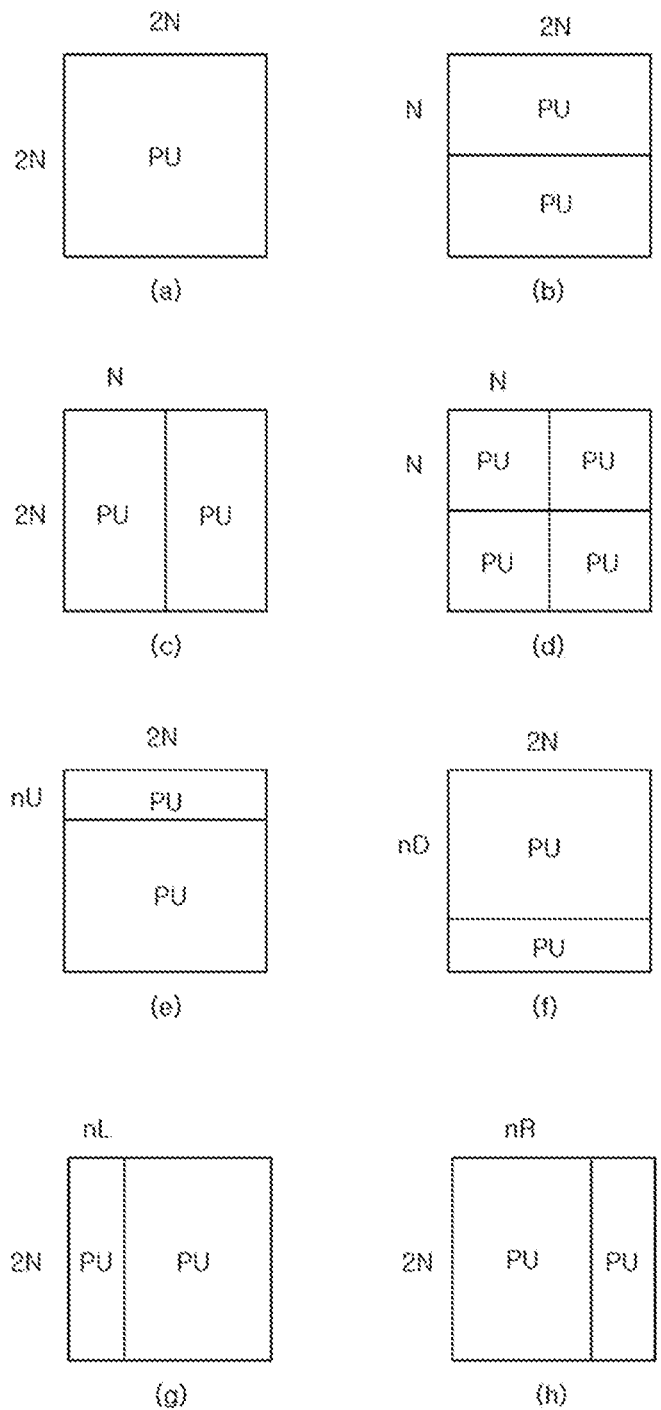

On the other hand, in the case of the inter prediction mode, when the size of the coding unit CU is 2N×2N, the prediction unit PU can have any of among 2N×2N shown in FIG. 4A, 2N×N shown in FIG. 4B, N×2N shown in FIG. 4C, N×N shown in FIG. 4D, 2N×nU shown in FIG. 4E, 2N×nD shown in FIG. 4F, and nL×2N shown in FIG. 4G, and nR×2N shown in FIG. 4 H.

Figure 5:
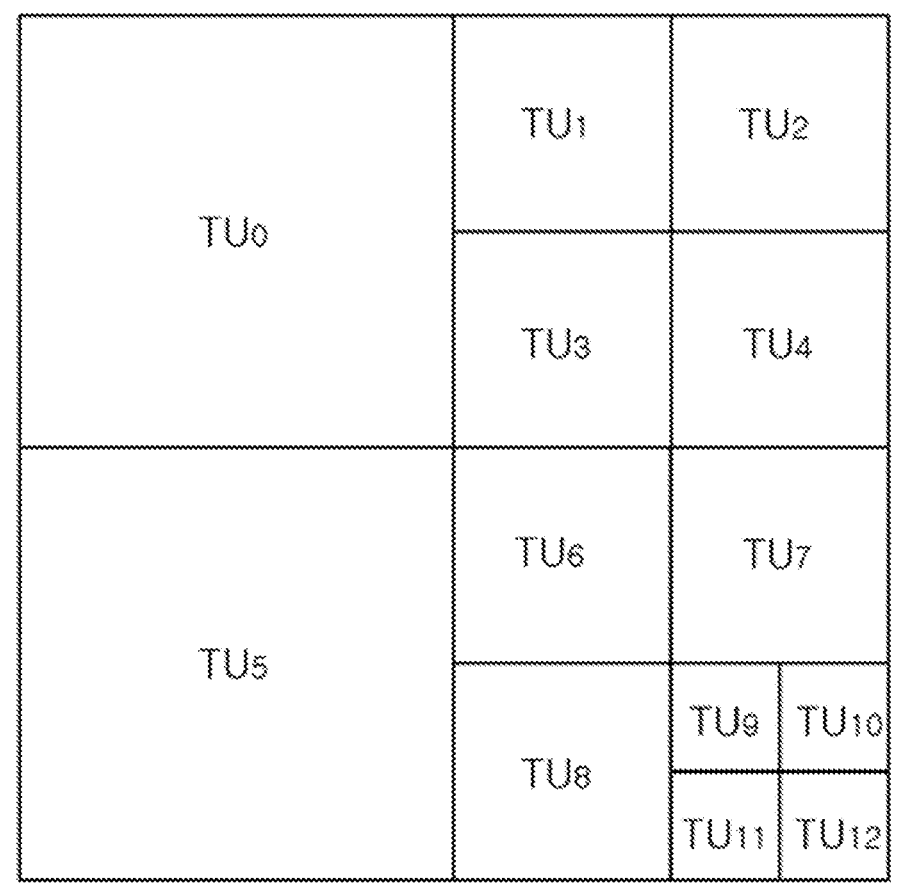

Referring to FIG. 5, the coding unit CU is divided into the quad tree structure, and then can be divided into four transform units Tus having a form of a square.

The four transform units TU having the square shape can be subdivided into a quad tree structure, respectively, and the depth of the transform unit TU divided into the quad tree structure may have any one of an integer value from 0 to 3.

Here, when the coding unit CU is the inter prediction mode, the prediction unit PU and the transform unit TU that are divided from the coding unit CU may have a division structure that is independent of each other.

When the coding unit CU is the intra prediction mode, the transform unit TU divided from the coding unit CU may not be larger than the size of the prediction unit PU.

In addition, the transform unit TU divided as described above can have maximum size of 64×64 pixels.

The transform unit 120 converts an original block of the input prediction unit PU and the intra prediction unit 150 or a residual block, which is a residual signal between the prediction blocks generated in the inter prediction unit 160, and the transform may be performed with the transform unit TU as a basic unit.

In the transform process, different transform matrices may be determined according to the prediction mode (intra or inter), since the residual signal of the intra prediction has directionality according to the intra prediction mode, the transformation matrix may be adaptively determined according to the intra prediction mode.

The transform unit can be transformed by a two (horizontal and vertical) one-dimensional transformation matrix. For example, in the case of inter prediction, a predetermined transform matrix may be determined.

On the other hand, in the case of the intra prediction, when the intra prediction mode is horizontal, the probability that the residual block has directionality in the vertical direction becomes high, a DCT-based integer matrix is applied in the vertical direction, and a DST-based or KLT-based integer matrix is applied in the horizontal direction. While the intra prediction mode is vertical, the DST-based or KLT-based integer matrix may be applied in the vertical direction and the DCT-based integer matrix may be applied in the horizontal direction.

In the case of the DC mode, the DCT-based integer matrix can be applied to both directions.

And, in the case of the intra prediction, the transformation matrix may be adaptively determined based on the size of the transform unit TU.

The quantization unit 130 determines a quantization step size for quantizing the coefficients of the residual block transformed by the transform matrix, the quantization step size may be determined for each quantization unit larger than a predetermined size.

The size of the quantization unit may be 8×8 or 16×16, and the quantization unit 130 quantizes the coefficients of the transform block using the quantization matrix determined according to the quantization step size and the prediction mode.

Also, the quantization unit 130 may use the quantization step size of the quantization unit adjacent to the current quantization unit as the quantization step size predictor of the current quantization unit.

The quantization unit 130 searches the left quantization unit, the top quantization unit, and the top left quantization unit of the current quantization unit in order, and generates the quantization step size predictor of the current quantization unit using one or two valid quantization step sizes.

For example, the quantization unit 130 may determine the valid first quantization step size searched in the above order as a quantization step size predictor, or determine an average value of two effective quantization step sizes searched in the above order as the quantization step size predictor, or when only one quantization step size is valid, it may be determined as the quantization step size predictor.

When the quantization step size predictor is determined, the quantization unit 130 transmits the difference value between the quantization step size of the current quantization unit and the quantization step size predictor to the entropy encoding unit 140.

On the other hand, neither the left coding unit, the top coding unit, the top left coding unit of the current coding unit exists, or there may be a coding unit that was previously present on the coding order within the maximum coding unit.

Therefore, the quantization step sizes of the quantization units immediately before the coding order within the quantization unit adjacent to the current coding unit and the maximum coding unit may be candidates.

In this case, the priority may be set by following order (1) the left quantization unit of the current coding unit, (2) the top quantization unit of the current coding unit, (3) the top left side quantization unit of the current coding unit, and (4) a quantization unit immediately before the encoding order. The above order may be changed, and the top left side quantization unit may be omitted.

Meanwhile, the quantized transform block is transferred to the inverse quantization unit 135 and the scanning unit 131.

The scanning unit 131 scans the coefficients of the quantized transform block to convert the coefficients into one-dimensional quantization coefficients. In this case, since the coefficient distribution of the transform block after quantization may be dependent on the intra prediction mode, the scanning method may be determined according to the intra prediction mode.

The coefficient scanning method may be determined depending on the size of the transform unit, the scan pattern may be varied according to the directional intra prediction mode. In this case, the scan order of the quantization coefficients may be scanned in the reverse direction.

If the quantized coefficients are divided into a plurality of sub-sets, the same scan pattern may be applied to the quantization coefficients within each sub-set, the scan pattern between sub-set may be applied to zigzag scan or diagonal scan.

Meanwhile, the scan pattern is preferably scanned from the main sub-set including the DC to the remaining sub-sets in the forward direction, but the reverse direction is also available.

It is also possible to set the scan pattern between the sub-sets in the same manner as the scan pattern of the quantized coefficients within the sub-sets, the scan pattern between the sub-sets may be determined according to the intra prediction mode.

On the other hand, the encoding apparatus 10 transforms to the decoding device 20 the bit stream including information which may indicate the position of the last non-zero quantization coefficient in the transform unit PU and the position of the last non-zero quantization coefficient in each sub-set.

The inverse quantization unit 135 dequantizes the quantization coefficients quantized as described above, the inverse transform unit 125 performs the inverse transform by a transform unit TU basis, so that the dequantized transform coefficients are reconstructed into the residual blocks of the spatial region.

The adder 195 adds the residual block reconstructed by the inverse transform unit 125 and the prediction block received from the intra prediction unit 150 or the inter prediction unit 160 to generate a reconstruction block.

In addition, the post processing unit 170 performs (1) a deblocking filtering process for removing the blocking effect generated in the restored picture, (2) a sample adaptive offset (SAO) application process for compensating the difference value with respect to the original image in units of pixels, and (3) an adaptive loop filtering ALF process for compensating the difference value with the original image by the coding unit.

The deblocking filtering process can be applied to a boundary of the prediction unit PU or the transform unit TU having a size larger than a predetermined size.

For example, the deblocking filtering process includes the steps of determining a boundary to be filtered, determining a boundary filtering strength to apply to the boundary, determining whether a deblocking filter is applied, and selecting a filter to be applied to the boundary when it is determined to apply the deblocking filter.

Meanwhile, whether or not the deblocking filter is applied may be determined by (i) whether the boundary filtering strength is greater than zero, and (ii) whether the value, indicating the degree of change of the pixel values at the boundary of two blocks (P block, Q block) adjacent to the boundary to be filtered, is smaller than the first reference value determined by the quantization parameter.

The filter is preferably at least two. If the absolute value of the difference value between two pixels located at the block boundary is greater than or equal to the second reference value, a filter that performs relatively weak filtering is selected.

The second reference value is determined by the quantization parameter and the boundary filtering strength.

In addition, an application process of sample adaptive offset SAO is intended to reduce a distortion between a pixel in an image to which the deblocking filter is applied and a source pixel, it may be determined that whether to perform the sample adaptive offset SAO application process in picture or slice units.

The picture or slice may be divided into a plurality of offset regions, an offset type may be determined for each offset region, and the offset type may include an edge offset types of a predetermined number (for example, four) and two band offset types.

For example, if the offset type is the edge offset type, it is determined an edge type to which each pixel belongs and applies a corresponding offset thereto, the edge type can be determined based on the distribution of two pixel values adjacent to the current pixel.

The adaptive loop filtering ALF process can perform a filtering on the basis of a value obtained by comparing an image reconstructed through the deblocking filtering process or the adaptive offset applying process and an original image.

The picture storage unit 180 receives the post-processed image data from the post processing unit 170, reconstructs and restores the pictures in a picture unit, the picture may be a frame-based image or a field-based image.

The inter prediction unit 160 performs the motion estimation using at least one reference picture stored in the picture storage unit 180, and the reference picture index indicating the reference picture and the motion vector can be determined.

In this case, depending on the determined reference picture index and motion vector, a prediction block corresponding to the prediction unit to be coded can be extracted from the reference picture used for the motion estimation among a plurality of reference pictures stored in the picture storage unit 180.

The intra prediction unit 150 may perform the intra prediction encoding using the reconstructed pixel values inside the picture including the current prediction unit.

The intra prediction unit 150 receives the current prediction unit to be predicted and encoded and performs the intra prediction by selecting one of a predetermined number of intra prediction modes according to the size of the current block.

The intra prediction unit 150 adaptively filters the reference pixels to generate the intra prediction blocks, if the reference pixels are not available, the reference pixels may be generated using available reference pixels.

The entropy encoding unit 140 may entropy-encode a quantization coefficient quantized by a quantization unit 130, the intra prediction information received from the intra prediction unit 150, the motion information received from the inter prediction unit 160, and the like.

Figure 6:
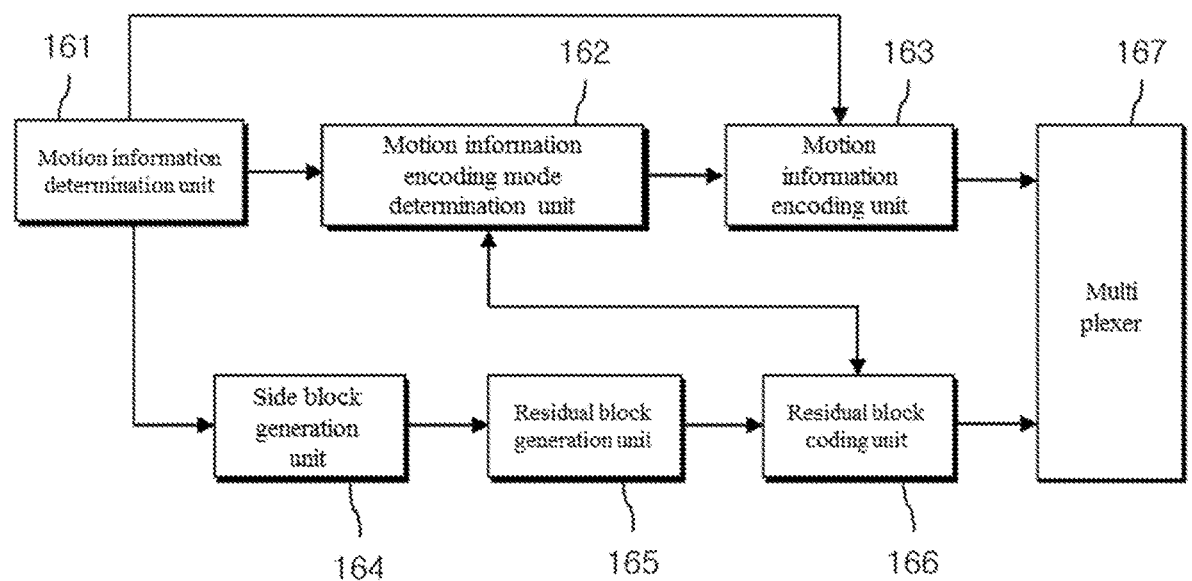
FIG. 6 is a block diagram for describing an embodiment of a method of performing inter prediction in an image coding apparatus.

FIG. 6 is a block diagram of an embodiment of a configuration for performing the inter prediction in the encoder 10. The inter prediction encoder includes a motion information determination unit 161, a motion information encoding mode determination unit 162, a motion information encoding unit 163, a prediction block generation unit 164, a residual block generation unit 165, a residual block coding unit 166, and a multiplexer 167.

Referring to FIG. 6, the motion information determination unit 161 determines the motion information of the current block, the motion information includes the reference picture index and the motion vector, the reference picture index may indicate any one of pictures that have been previously encoded and reconstructed.

When the current block is uni-directionally inter predictive coded, the current block indicates one of the reference pictures belonging to the list 0 (L0), while when the current block is bi-directionally predictive coded, the current block includes a reference picture index indicating one of the reference pictures of the list 0 (L0) and a reference picture index indicating one of the reference pictures of the list 1 (L1).

In addition, when the current block is bi-directionally predictive-coded, it may include an index indicating one or two pictures among the reference pictures of the composite list LC generated by combining the list 0 and the list 1.

The motion vector indicates the position of the prediction block in the picture where each reference picture index is indicated, the motion vector may be a pixel unit (integer unit) or a sub-pixel unit.

For example, the motion vector may have a resolution of ½, ¼, ⅛ or 1/16 pixels, if the motion vector is not an integer unit, the prediction block can be generated from the pixels of integer units.

The motion information encoding mode determination unit 162 may determine a coding mode for the motion information of the current block as one of a skip mode, a merge mode, and an AMVP mode.

In the skip mode, there is a skip candidate having the same motion information as the motion information of the current block to apply when the residual signal is zero, the skip mode can be applied when the current block which is the prediction unit PU is the same size as the coding unit CU.

The merge mode is applied when there is a merge candidate having the same motion information as the current block motion information, and the current block is different in size from the coding unit CU, but when the current block and the coding unit CU are the same, the merge mode is applied and there is a residual signal. On the other hand, the merge candidate and the skip candidate may be the same.

AMVP mode is applied when the skip mode and the merge mode are not applied, the AMVP candidate having the motion vector most similar to the motion vector of the current block can be selected as an AMVP predictor.

The motion information encoding unit 163 may the encode motion information according to a method determined by the motion information encoding mode determination unit 162.

For example, when the motion information encoding mode is the skip mode or the merge mode, the motion information encoding unit 163 performs a merge motion vector encoding process, in an AMVP mode, the AMVP encoding process can be performed.

The prediction block generation unit 164 generates the prediction block using the motion information of the current block, if the motion vector is an integer unit, the block corresponding to the position indicated by the motion vector in the picture indicated by the reference picture index is copied to generate the prediction block of the current block.

On the other hand, when the motion vector is not an integer unit, the prediction block generation unit 164 can generate the pixels of the prediction block from the pixels in the integer unit in the picture where the reference picture index is indicated.

In this case, a prediction pixel is generated using an 8-tap interpolation filter for the luminance pixel, for a chrominance pixel, the predictive pixel can be generated using a 4-tap interpolation filter.

The residual block generation unit 165 generates the residual block using the current block and the prediction block of the current block, if the size of the current block is 2N×2N, the residual block can be generated using the 2N×2N prediction block corresponding to the current block and the current block.

On the other hand, when the size of the current block used for prediction is 2N×N or N×2N, after obtaining the prediction block for each of the two 2N×N blocks constituting 2N×2N, the prediction block for each of the 2N×N blocks constituting 2N×2N is obtained, the final prediction block of 2N×2N size can be generated using the two 2N×N prediction blocks.

Also, a 2N×2N residual block may be generated using the 2N×2N prediction block,

Overlap smoothing may be applied to the pixels of the boundary portion to resolve the discontinuity of the boundary portion of the two prediction blocks having the size of 2N×N.

The residual block coding unit 166 divides the residual block into one or more transform units (TUs). Each transform unit TU can be transcoded, quantization encoded, and entropy-encoded.

The residual block coding unit 166 can transform the residual block generated by the inter prediction method using an integer-based transform matrix, the transform matrix may be an integer-based DCT matrix.

Meanwhile, the residual block coding unit 166 uses a quantization matrix to quantize the coefficients of the residual block transformed by the transform matrix, the quantization matrix may be determined by a quantization parameter.

Wherein the quantization parameter is determined for each coding unit CU of a predetermined size or larger, if the current coding unit CU is smaller than the predetermined size, only the quantization parameter of the first coding unit CU in the coding order among the coding units CU within the predetermined size is encoded, and the quantization parameters of the remaining coding units CU may not be encoded, since the quantization parameters are the same as the above parameters.

In addition, the coefficients of the transform block may be quantized using a quantization matrix determined according to the quantization parameter and the prediction mode.

The quantization parameter determined for each coding unit CU larger than the predetermined size can be predicted and encoded using the quantization parameter of the coding unit CU adjacent to the current coding unit CU.

The quantization parameter predictor of the current coding unit CU can be generated by searching in the order of the left coding unit CU, the top coding unit CU of the current coding unit CU and using one or two valid quantization parameters.

For example, the valid first quantization parameter searched in the above order may be determined as the quantization parameter predictor, the valid first quantization parameter can be determined as the quantization parameter predictor by searching in the order of the left coding unit CU and the coding unit CU immediately before the coding order.

The coefficients of the quantized transform block are scanned and converted into one-dimensional quantization coefficients, the scanning method can be set differently according to the entropy encoding mode.

For example, when encoded with CABAC, the inter prediction encoded quantized coefficients can be scanned in one predetermined manner (zigzag, or raster scan in diagonal direction), when the coefficients is encoded by CAVLC, it can be scanned in a different manner from the above method.

For example, in the case of the inter scanning method, it may be determined by the zigzag method, while in the case of intra, it may be determined according to the intra prediction mode, the coefficient scanning method may be determined differently depending on the size of the transform unit.

Meanwhile, the scan pattern may vary according to the directional intra prediction mode, the scan order of the quantization coefficients may be scanned in the reverse direction.

The multiplexer 167 multiplexes the motion information encoded by the motion information encoding unit 163 and the residual signals coded by the residual block coding unit 166.

The motion information may vary according to the encoding mode, for example, in the case of skipping or merge, only the index indicating the predictor is included, while in case of AMVP, it may include the reference picture index of the current block, the differential motion vector, and an AMVP index.

Hereinafter, the embodiment of the operation of the intra prediction unit 150 shown in FIG. 1 will be described in detail.

First, the intra prediction unit 150 receives the prediction mode information and the size of the prediction unit PU from the picture division unit 110, the reference pixel may be read from the picture storage unit 180 to determine the intra prediction mode of the prediction unit PU.

The intra prediction unit 150 determines whether the reference pixel is generated by examining whether or not a reference pixel which is not available exists, the reference pixels may be used to determine the intra prediction mode of the current block.

When the current block is located at the top boundary of the current picture, pixels adjacent to the top side of the current block are not defined, when the current block is located at the left boundary of the current picture, pixels adjacent to the left side of the current block are not defined, then it can be determined that the pixels are not usable pixels.

Also, even if the current block is located at the slice boundary and the pixels adjacent to the top side or the left side of the slice are not firstly encoded and reconstructed, it can be determined that they are not usable pixels.

As described above, if there are no pixels adjacent to the left or top side of the current block, or there are no pixels which are previously encoded and reconstructed pixels, the intra prediction mode of the current block may be determined using only the available pixels.

On the other hand, a reference pixel at an unusable position may be generated using available reference pixels of the current block, for example, if the pixels of the top block are not available, the top pixels may be created using some or all of the left pixels, or if the pixels of the left block are not available, the left pixels may be created using some or all of the top pixels.

That is, the reference pixel is generated by copying the available reference pixel at a position nearest to a predetermined direction from a reference pixel at an unavailable position, or if there is no reference pixel available in the predetermined direction, the reference pixel can be generated by copying the available reference pixel in the nearest position in the opposite direction.

On the other hand, even if the top or left pixels of the current block exist, the reference pixel may be determined as a non-available reference pixel according to the coding mode of the block to which the pixels belong.

For example, when the block, to which the reference pixel adjacent to the top side of the current block belongs, is inter-coded and reconstructed, the pixels can be determined as unavailable pixels.

In this case, available reference pixels may be generated using pixels belonging to the block obtained by intra-coding the block adjacent to the current block, information that the encoding device 10 determines the usable reference pixel in accordance with the encoding mode is transferred to the decoding device 20.

The intra prediction unit 150 determines the intra prediction mode of the current block using the reference pixels, the number of intra prediction modes, that can be accepted in the current block, may vary depending on the size of the block.

For example, if the current block size is 8×8, 16×16, or 32×32, there may be 34 intra prediction modes, while if the current block size is 4×4, there may be 17 intra prediction modes.

The 34 or 17 intra prediction modes may be composed of at least one non-directional mode and a plurality of directional modes.

The one or more non-directional modes may be a DC mode and/or a planar mode. When the DC mode and the planar mode are included in the non-directional mode, there may be 35 intra prediction modes regardless of the size of the current block.

In this case, two non-directional modes (DC mode and planar mode) and 33 directional modes may be included.

In the planar mode, the prediction block of the current block is generated using at least one pixel value (or a predicted value of the pixel value, hereinafter referred to as a first reference value) located at the bottom-right of the current block and the reference pixels, respectively.

The configuration of the decoding device according to an embodiment of the present invention can be derived from the configuration of the image encoding apparatus 10 described with reference to FIGS. 1 to 6. For example, the image can be decoded by reversely performing the processes of the image encoding method as described with reference to FIGS. 1 to 6.

Figure 7:
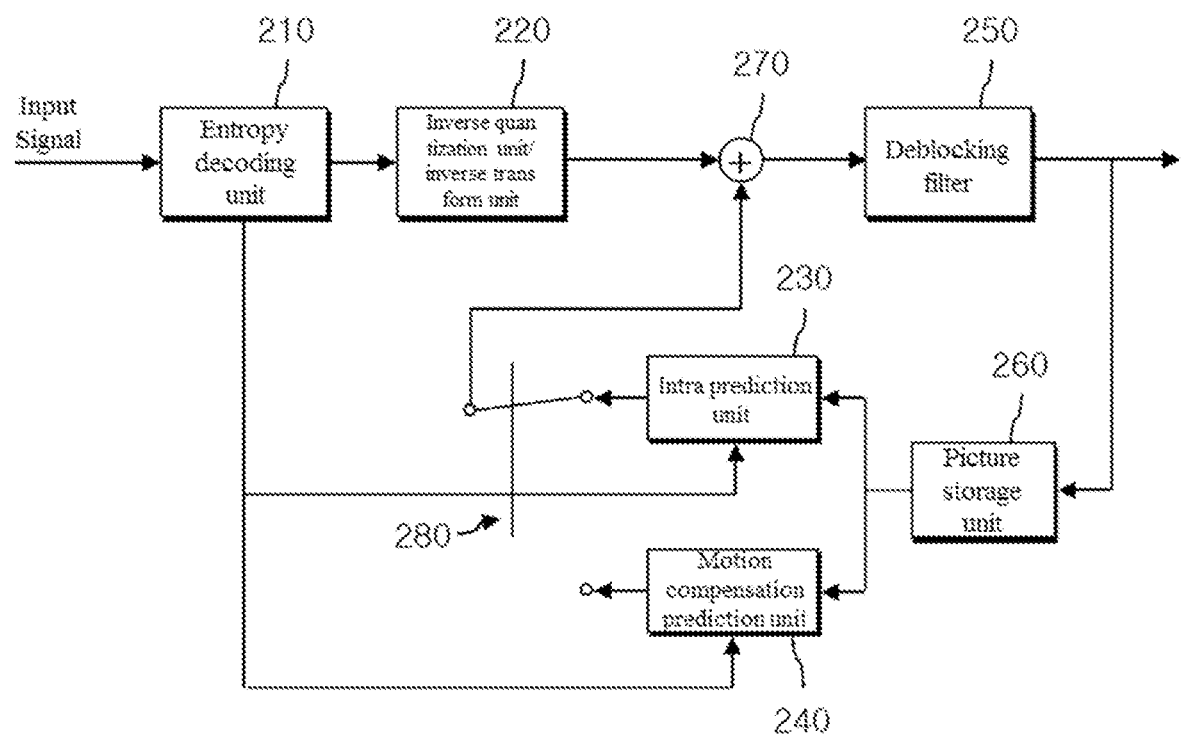
FIG. 7 is a block diagram showing the configuration of an image decoding apparatus according to an embodiment of the present invention.

FIG. 7 is a block diagram illustrating a configuration of the decoding device according to an exemplary embodiment of the present invention, the decoding device 20 includes an entropy decoding unit 210, an inverse quantization/inverse transform unit 220, an adder 270, a deblocking unit 270, a deblocking filter 250, a picture storage unit 260, an intra prediction unit 230, a motion compensation prediction unit 240, and an intra/inter changeover switch 280.

The entropy decoding unit 210 receives and decodes a bitstream encoded from the image encoding apparatus 10, separates the encoded bitstream into an intra prediction mode index, motion information, a quantization coefficient sequence, and transmits the decoded motion information to the motion compensation prediction unit 240.

The entropy decoding unit 210 transmits the intra prediction mode index to the intra prediction unit 230 and the inverse quantization/inverse transform unit 220, and transfers the inverse quantization coefficient sequence to the inverse quantization/inverse transform unit 220.

The inverse quantization/inverse transform unit 220 converts the quantization coefficient sequence into a two-dimensional inverse quantization coefficient, and for example, one of a plurality of scanning patterns can be selected for the transform and the scanning pattern can be selected based on the prediction mode of the current block (i.e., intra prediction or inter prediction) and the intra prediction mode.

The inverse quantization/inverse transform unit 220 applies the quantization matrices selected from a plurality of quantization matrices to the inverse quantization coefficients of the two-dimensional array to reconstruct the quantization coefficients.

Meanwhile, different quantization matrices are applied depending on the size of the current block to be reconstructed, the quantization matrix may be selected based on at least one of the prediction mode and the intra prediction mode of the current block for a block of the same size.

The inverse quantization/inverse transform unit 220 reconstructs the residual block by inversely transforming the reconstructed quantization coefficient, the inverse transform process may be performed with the transform unit TU as a basic unit.

The adder 270 adds the residual block reconstructed by the inverse quantization/inverse transform unit 220 on the prediction blocks generated by the intra prediction unit 230 or the motion compensation prediction unit 240.

The deblocking filter 250 performs deblocking filter process on the reconstructed image generated by the adder 270, and reduces the deblocking artifact due to the video loss from the quantization process.

The picture storage unit 260 is a frame memory for storing a local decoded image performed to the deblocking filter process by the deblocking filter 250.

The intra prediction unit 230 reconstructs the intra prediction mode of the current block based on the intra prediction mode index received from the entropy decoding unit 210, and generates a prediction block according to the reconstructed intra prediction mode.

The motion compensation prediction unit 240 generates the prediction block for the current block from the picture stored in the picture storage unit 260 based on the motion vector information, and generates the prediction block by applying a selected interpolation filter, when the motion compensation with small number of precision is applied.

The intra/inter changeover switch 280 provides the prediction block generated in one of the intra prediction unit 230 and the motion compensation prediction unit 240 based on the encoding mode to the adder 270.

Figure 8:
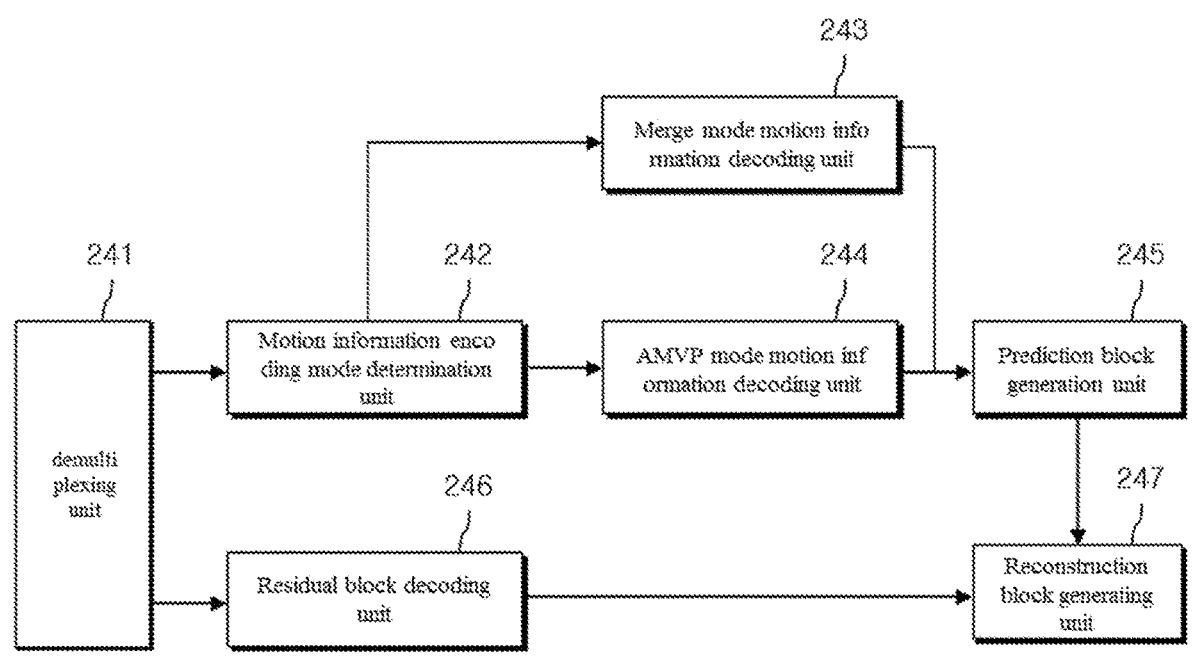
FIG. 8 is a block diagram for describing an embodiment of a method of performing inter prediction in the image decoding apparatus.

FIG. 8 is a block diagram of an embodiment of a configuration for performing inter prediction in the decoding device 20, the inter prediction decoder includes an inter prediction decoder demultiplexing unit 241, a motion information encoding mode determination unit 242, a merge mode motion information decoding unit 243, an AMVP mode motion information decoding unit 244, a prediction block generation unit 245, a residual block decoding unit 246, and a reconstruction block generating unit 247.

Referring to FIG. 8, the demultiplexing unit 241 demultiplexes the currently encoded motion information and the encoded residual signals from the received bitstream, transmits the demultiplexed motion information to a motion information encoding mode determination unit 242, and transmits the demultiplexed residual signal to the residual block decoding unit 246.

The motion information encoding mode determination unit 242 determines the motion information encoding mode of the current block, if the skip_flag of the received bit stream has a value of 1, it can be determined that the motion information encoding mode of the current block is coded in the skip encoding mode.

The motion information encoding mode determination unit 242 determines that it can be determined that the motion information encoding mode of the current block is encoded in the merge mode, the skip_flag of the received bitstream has a value of 0, and the motion information received from the demultiplexing unit 241 has merge indices only.

Also, the motion information encoding mode determination unit 242 determines that the motion information encoding mode of the current block is coded in the AMVP mode when the skip_flag of the received bitstream has a value of 0, the motion information received from the demultiplexing unit 241 has a reference picture index, a differential motion vector, and an AMVP index.

The merge mode motion information decoding unit 243 may not be activated when the motion information encoding mode determination unit 242 determines that the motion information encoding mode of the current block is skipped or merge mode, the AMVP mode motion information decoding unit 244 may be activated when the motion information encoding mode determination unit 242 determines that the motion information encoding mode of the current block is the AMVP mode.

The prediction block generation unit 245 generates the prediction block of the current block using the motion information reconstructed by the merge mode motion information decoding unit 243 or the AMVP mode motion information decoding unit 244.

When the motion vector is an integer unit, the prediction block of the current block may generate by copying a block corresponding to a position indicated by the motion vector in the picture indicated by the reference picture index.

On the other hand, when the motion vector is not an integer unit, the pixels of the prediction block are generated from the integer unit pixels in the picture indicated by the reference picture index, in this case, an 8-tap interpolation filter may be used for a luminance pixel, and a 4-tap interpolation filter may be used for a chrominance pixel to generate the prediction pixel.

The residual block decoding unit 246 entropy decodes the residual signal, inversely scans the entropy-decoded coefficients to generate a two-dimensional quantized coefficient block, the inverse scanning method can be changed according to the entropy decoding method.

For example, as decoding based on CABAC, the inverse scanning method may be applied to the diagonal direction raster inverse scan method, while as decoding based on CAVLC, the inverse scanning method can be applied to the zigzag reverse scan method. In addition, the inverse scanning method may be determined differently depending on the size of the prediction block.

The residual block decoding unit 246 dequantizes the generated coefficient block using the inverse quantization matrix, the quantization parameter may be reconstructed to derive the quantization matrix. Here, the quantization step size can be reconstructed for each coding unit of a predetermined size or more.

The residual block decoding unit 260 reconstructs the residual block by inversely transforming the inverse quantized coefficient block.

The reconstruction block generation unit 270 generates reconstruction blocks by adding the prediction blocks generated by the prediction block generation unit 250 and the residual blocks generated by the residual block decoding unit 260.

Hereinafter, an embodiment of a process of restoring a current block through the intra prediction will be described with reference to FIG. 7.

First, the intra prediction mode of the current block is decoded from the received bit stream, for this purpose, an entropy decoding unit 210 can reconstruct the first intra prediction mode index of the current block by referring to one of a plurality of intra prediction mode tables.

The intra prediction mode tables are tables shared by the encoding apparatus 10 and the decoding apparatus 20, any one of the tables selected in accordance with the distribution of the intra prediction mode for a plurality of blocks adjacent to the current block can be applied.

For example, if the intra prediction mode of the left block of the current block is the same as the intra prediction mode of the top block of the current block, the first intra prediction mode table is applied to restore the first intra prediction mode index of the current block, while if not, the second intra prediction mode table may be applied to reconstruct the first intra prediction mode index of the current block.

As another example, when the intra prediction modes of the top block and the left block of the current block are both the directional intra prediction mode, the prediction mode index of the current block is reconstructed by applying the first intra prediction mode table if the direction of the intra prediction mode of the top block and the direction of the intra prediction mode of the left block are within a predetermined angle, while the first intra prediction mode index of the current block is reconstructed by applying the second intra prediction mode table, if the direction is out of the predetermined angle.

The entropy decoding unit 210 transmits the first intra prediction mode index of the reconstructed current block to the intra prediction unit 230.

The intra prediction unit 230, which receives the first intra prediction mode index, and can determine the maximum possible mode of the current block as the intra prediction mode of the current block when the index has a minimum value (i.e., 0).

On the other hand, the intra prediction unit 230, compares the index indicated by the maximum possible mode of the current block with the first intra prediction mode index when the index has a value other than 0. As the comparison result, if the first intra prediction mode index is not smaller than the index indicated by the maximum possible mode of the current block, the intra prediction unit may determine the intra prediction mode corresponding to a second intra prediction mode index obtained by adding 1 to the first intra prediction mode index as the intra prediction mode of the current block. Otherwise, the intra prediction unit may determine the intra prediction mode corresponding to the first intra prediction mode index may be determined as the intra prediction mode of the current block.

The allowable intra prediction mode for the current block may be configured with at least one non-directional mode and a plurality of directional modes.

The one or more non-directional modes may be the DC mode and/or the planar mode. In addition, either the DC mode or the planar mode may be adaptively included in the allowable intra prediction mode set.

To this end, information specifying the non-directional mode included in the allowable intra prediction mode set may be included in the picture header or slice header.

Next, the intra prediction unit 230 reads the reference pixels from the picture storage unit 260 to generate the intra prediction blocks and the reference picture memory unit 260 determines whether or not there is a reference pixel which is not available.

The determination may be performed according to whether there are reference pixels used to generate the intra prediction block by applying the decoded intra prediction mode of the current block.

Next, when it is necessary to generate the reference pixel, the intra prediction unit 230 may generate the reference pixels at positions that are not available by using previously reconstructed available reference pixels.

The definition of the reference pixel that is not available and the method of generating the reference pixel may be the same as the operation in the intra prediction unit 150 according to FIG. 1, The reference pixels used for generating the intra prediction block may be selectively reconstructed according to the decoded intra prediction mode of the current block.

In addition, the intra prediction unit 230 determines whether to apply a filtering to the reference pixels to generate the prediction block. That is, it is possible to determine whether to apply the filtering to the reference pixels to generate an intra prediction block of the current block based on the decoded intra prediction mode and the size of the current prediction block.

Since the problem of the blocking artifact becomes larger as the size of the block increases, the number of prediction modes for filtering the reference pixel may be increase when the size of the block is larger. But the reference pixel may not be filtered to reduce the complexity, when the block is larger than a predetermined size, it can be regarded as a flat area.

If it is determined that the reference pixel needs to be applied to the filter, the intra prediction unit 230 filters the reference pixels using the filter.

At least two or more filters may be adaptively applied according to the degree of difference between the reference pixels. The filter coefficient of the filter is preferably symmetrical.

In addition, the above two or more filters may be adaptively applied according to the size of the current block. When filters are applied, a filter having the narrow bandwidth may be applied to a block having the small size, and other filter having the wide bandwidth may be applied to a block having a large size.

In the case of DC mode, since a prediction block is generated with an average value of reference pixels, there is no need to apply the filters, it is not necessary to apply the filter to the reference pixel in the vertical mode in which the image has correlation in the vertical direction, while it may not be necessary to apply the filter to the reference pixel even in the horizontal mode in which the image has correlation in the horizontal direction.

In this way, whether or not the filtering is applied has correlation to the intra prediction mode of the current block, the reference pixel can be adaptively filtered based on the intra prediction mode of the current block and the size of the prediction block.

Next, the intra prediction unit 230 generates the prediction block using the reference pixel or the filtered reference pixels according to the reconstructed intra prediction mode. The generation of the prediction block may be the same as the operation in the encoding device 10, and the detailed description thereof will be omitted.

The intra prediction unit 230 determines whether to filter the generated prediction block, the filtering operation may be determined using the information included in the slice header or the encoding unit header or according to the intra prediction mode of the current block.

If it is determined that the generated prediction block is to be filtered, the intra prediction unit 230 filters the pixel at a specific position in the prediction block generated using the available reference pixels adjacent to the current block to generate new pixels.

For example, in the DC mode, the prediction pixel in contact with the reference pixels among the prediction pixels may be filtered using the reference pixel in contact with the prediction pixel.

Accordingly, the predictive pixel is filtered using one or two reference pixels according to the position of the predictive pixel, the filtering of the prediction pixel in the DC mode can be applied to the prediction block of all sizes.

On the other hand, in the vertical mode, prediction pixels adjacent to the left reference pixel among the prediction pixels of the prediction block can be changed using reference pixels other than the top pixel used to generate the prediction block.

Likewise, in the horizontal mode, prediction pixels adjacent to the top reference pixel among the generated prediction pixels may be changed using reference pixels other than the left pixel used to generate the prediction block.

The current block can be reconstructed using the predicted block of the current block reconstructed in this manner and the residual block of the decoded current block.

Figure 9:
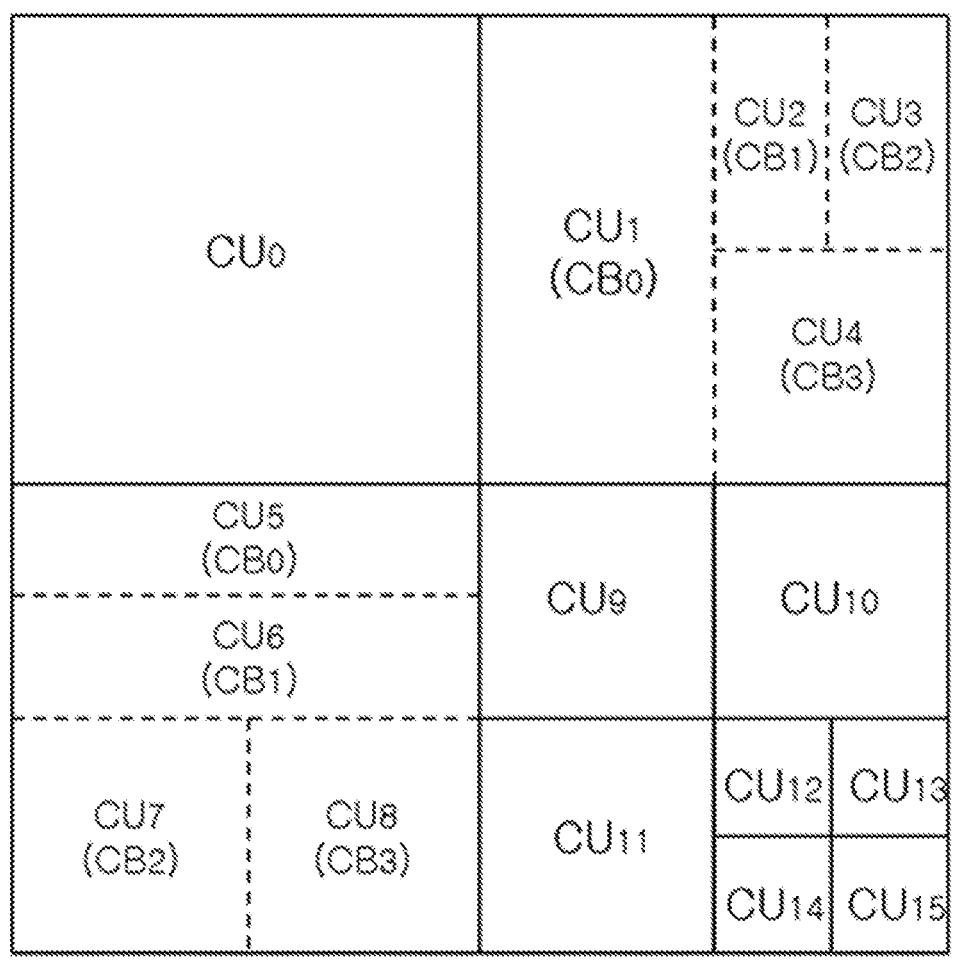
FIG. 9 is a diagram for describing a second embodiment of a method of dividing an image in a block unit and processing the image.

FIG. 9 is a view for explaining a second embodiment of a method of dividing and processing the image into block units.

Referring to FIG. 9, a coding tree unit CTU having a maximum size of 256×256 pixels is first divided into a quad tree structure, and can be divided into four coding units CUs having the form of a square.

Here, at least one of the coding units divided into the quad tree structure is divided into a binary tree structure, and can be subdivided into two coding units CU having a rectangular shape.

At least one of the coding units divided into the quad tree structure is divided into the quad tree structure, and may be subdivided into four coding units CUs having the form of the square.

And at least one of the subdivided coding units into the binary tree structure is subdivided into a binary tree structure again, and may be divided into two coding units CUs having the form of a square or a rectangle.

At least one of the coding units subdivided into the quad tree structure is divided into the quad tree structure or the binary tree structure, and may be divided into coding units CUs having the form of the square or the rectangle.

Coding blocks CBs divided and configured into the binary tree structure as described above can be used for prediction and transform without being further divided. That is, the size of the prediction unit PU and the transform unit TU belonging to the coding block CB, as shown in FIG. 9, may be the same as the size of the coding block CB.

Figure 3:
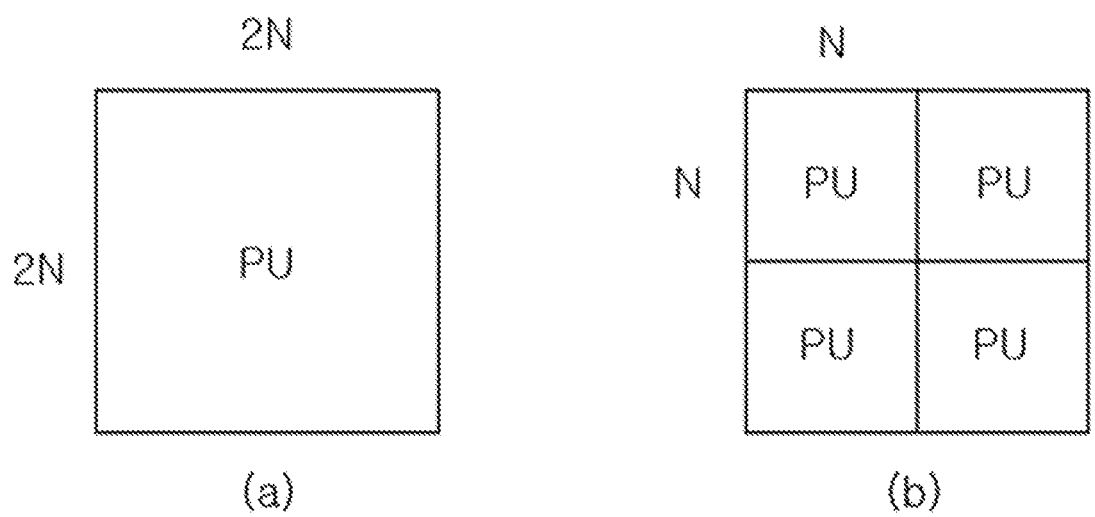

The coding unit divided into the quad tree structures as described above can be divided into one or more prediction units PUs using the method as described with reference to FIGS. 3 and 4.

In addition, the coding unit divided into the quad tree structure as described above can be divided into one or two or more transform units TU using the method described with reference to FIG. 5, and the divided transform unit TU can have a maximum size of 64×64 pixels.

FIG. 10 shows an embodiment of a syntax structure used for dividing and processing the image into block units.

Referring to FIG. 10, whether or not of the division of the coding unit CU as described with reference to FIG. 9 is expressed using split_cu_flag, The depth of the coding unit CU divided using the binary tree can be expressed using binary_depth.

In addition, whether or not the coding unit CU is divided into a binary tree structure may be represented by a separate binary_split_flag.

For the blocks (e.g., the coding unit CU, the prediction unit PU, and the transform unit TU) divided, the encoding and decoding operation of the image can be performed by the method as described with reference to FIGS. 9 and 10.

Hereinafter, with reference to FIGS. 11 to 16, still another embodiment of a method of dividing the coding unit CU into one or two or more transform units TU will be described.

According to the embodiment of the present invention, the coding unit CU can be divided into transform units TUs which are basic units in which the transform to the residual block is divided into a binary tree structure.

Figure 11:
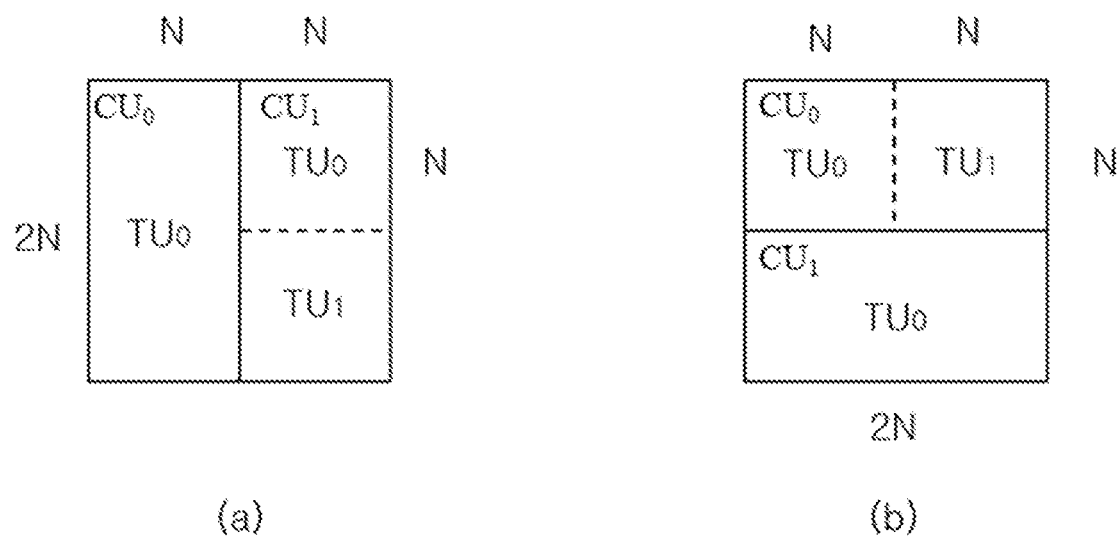
FIG. 11 is a diagram for describing a third embodiment of a method of dividing an image in a block unit and processing the image.

Referring to FIG. 11, at least one of the rectangular coding blocks CB0 and CB1 having a size of N×2N or 2N×N divided into the binary tree structure is divided into the binary tree structure again, and can be divided into square transform units TU0 and TU1 having the size of N×N.

As described above, the block-based image encoding method can perform prediction, transform, quantization, and entropy encoding steps, respectively.

In the prediction step, a predictive signal is generated by referring to a current encoding block and an existing encoded image or a surrounding image, and the difference signal with the current block can be calculated through the predictive signal.

On the other hand, in the transform step, the transform is performed using various transform functions by inputting the differential signal, the converted signal is classified into a DC coefficient and an AC coefficient to achieve the energy compaction so that the coding efficiency can be improved.

In the quantization step, the quantization is performed by inputting the transform coefficients, then, entropy encoding is performed on the quantized signal, so that the image can be encoded.

On the other hand, the image decoding method proceeds in the reverse order of the encoding process as described above, and the image quality distortion phenomenon may occur in the quantization step.

A method for reducing the image quality distortion while improving the coding efficiency, the size or shape of the transform unit TU and the type of transform function to be applied can be varied according to the distribution of the differential signal input as an input signal in the transform step and the characteristics of the image.

For example, if a block similar to the current block is searched through the block-based motion estimation process in the prediction step, the distribution of the differential signal can be generated in various forms according to the characteristics of the image using a cost measurement method such as Sum of Absolute Difference SAD or Mean Square Error MSE.

Thereby, the effective encoding can be performed by selectively determining the size or shape of the transform unit CU based on the distribution of the various difference signals and performing the transform.

Figure 12:
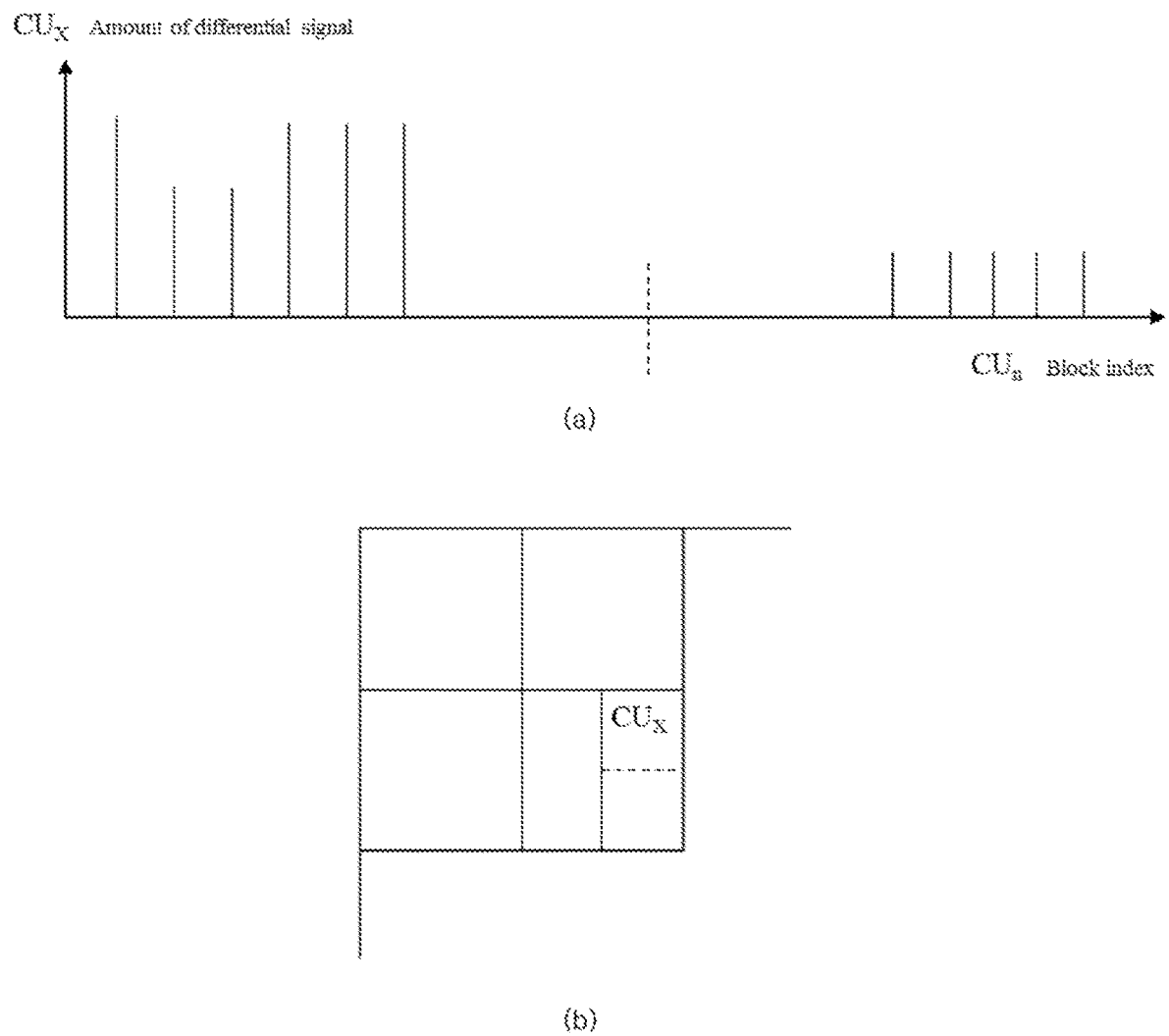
FIG. 12 is a diagram for describing an embodiment of a method of dividing a coding unit as a binary tree structure and configuring a transform unit.

Referring to FIG. 12, when the difference signal is generated in a certain coding block CBx as shown in FIG. 12 (a), the coding block CBx is divided into the binary tree structure and divided into two transform units TU, thereby performing the effective transform as shown in FIG. 12 (b).

For example, it can be indicated that the DC value generally represents the average value of the input signal, when the difference signal is received as an input of a transform process as shown in FIG. 12 (a), the DC value can be effectively represented by dividing the coding block CBx into two transform units TU.

Figure 13:
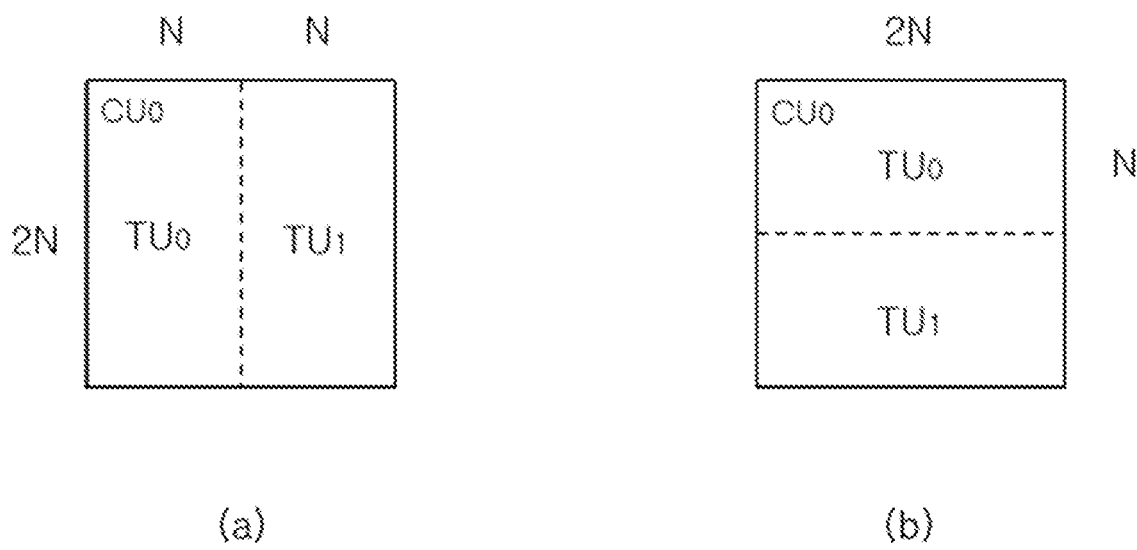
FIG. 13 is a diagram for describing a fourth embodiment of a method of dividing an image in a block unit and processing the image.

Referring to FIG. 13, a square coding unit CU0 having a size of 2N×2N is divided into a binary tree structure, and can be divided into rectangular transform units TU0 and TU1 having a size of N×2N or 2N×N.

According to another embodiment of the present invention, As described above, the step of dividing the coding unit CU into the binary tree structure is repeated two or more times, and can be divided into a plurality of transform units TU.

Figure 14:
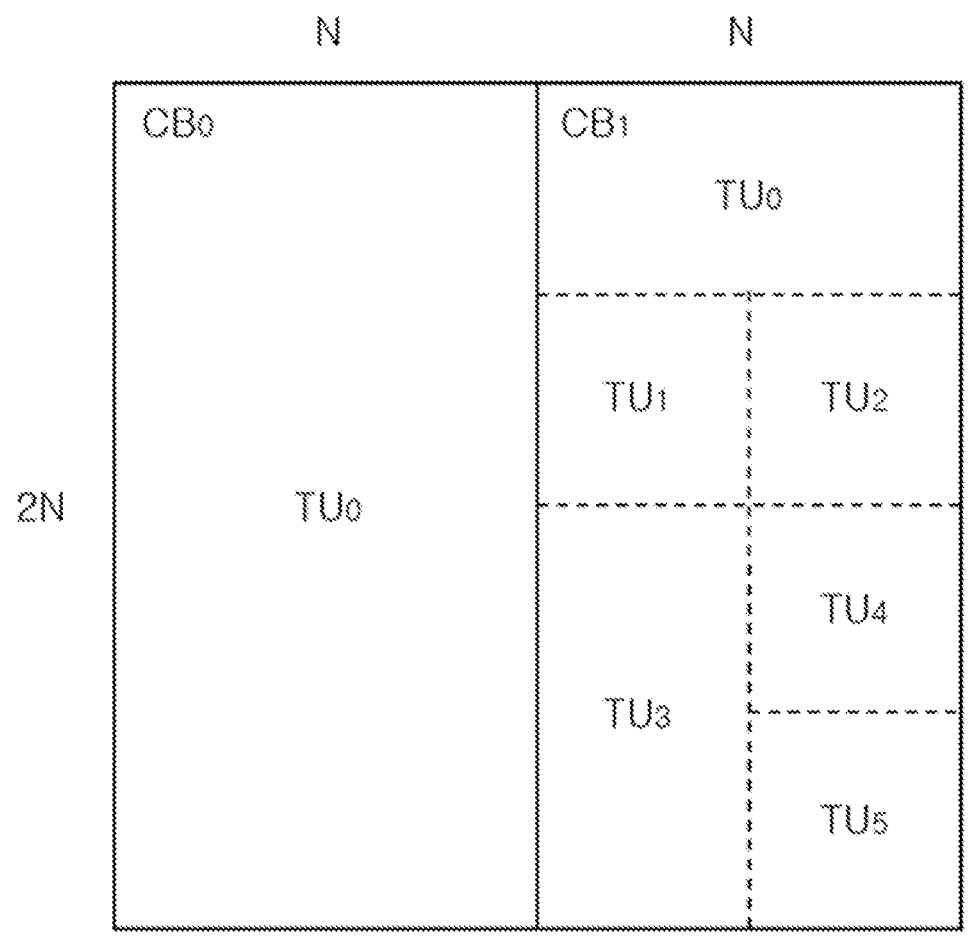
FIGS. 14 to 16 are diagrams for describing other embodiments of a method of dividing an image in a block unit and processing the image.

Referring to FIG. 14, a rectangular coding block CB1 having a size of N×2N is divided into a binary tree structure, the block having the size of the divided N×N is divided into the binary tree structure to form a rectangular block having a size of N/2×N or N×N/2, the block having the size of N/2×N or N×N/2 may be divided into the binary tree structure and divided into square transform units TU1, TU2, TU4, and TU5 having a size of N/2×N/2.

Figure 15:
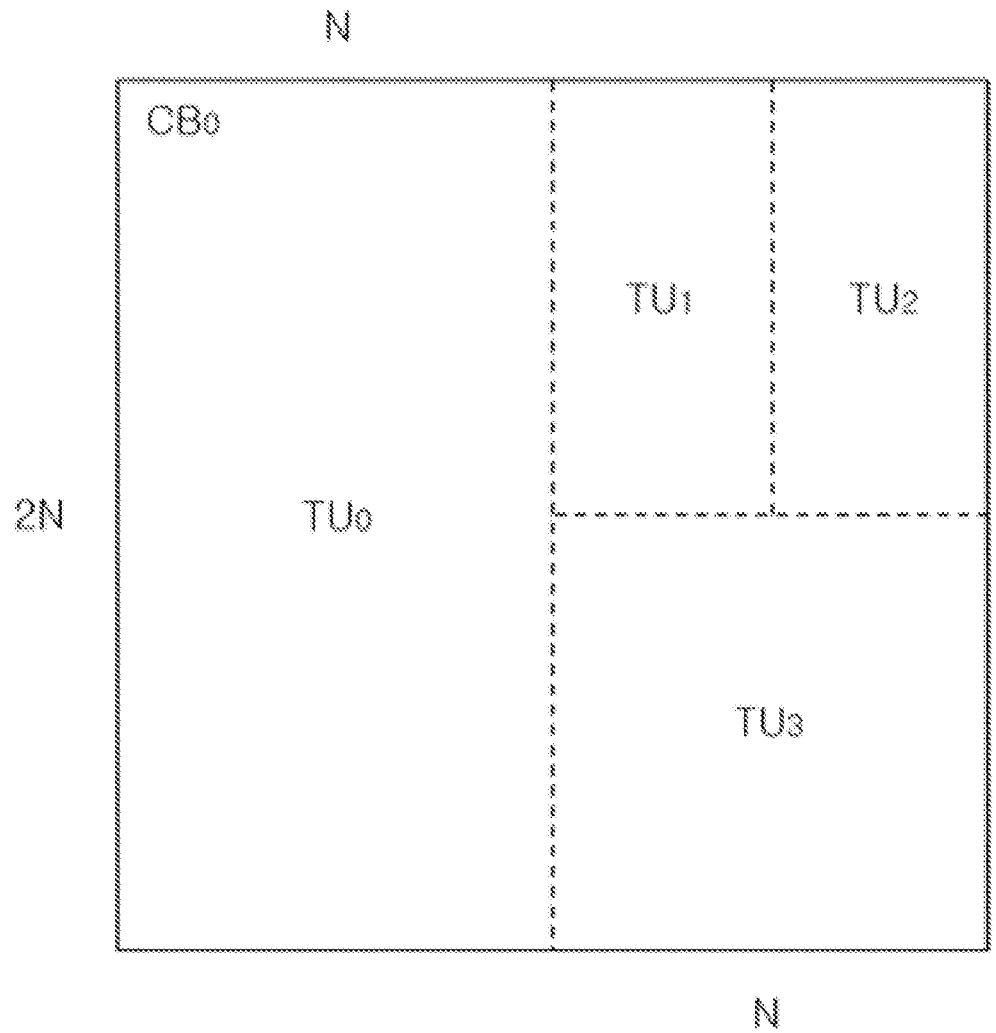

Referring to FIG. 15, a square coding block CB0 having a size of 2N×2N is divided into a binary tree structure, the block having the size of the divided N×2N is divided into the binary tree structure to form a square block having a size of N×N, the block having the size of N×N may be divided into the binary tree structure and divided into rectangular transform units TU1 and TU2 having a size of N/2×N.

Figure 16:
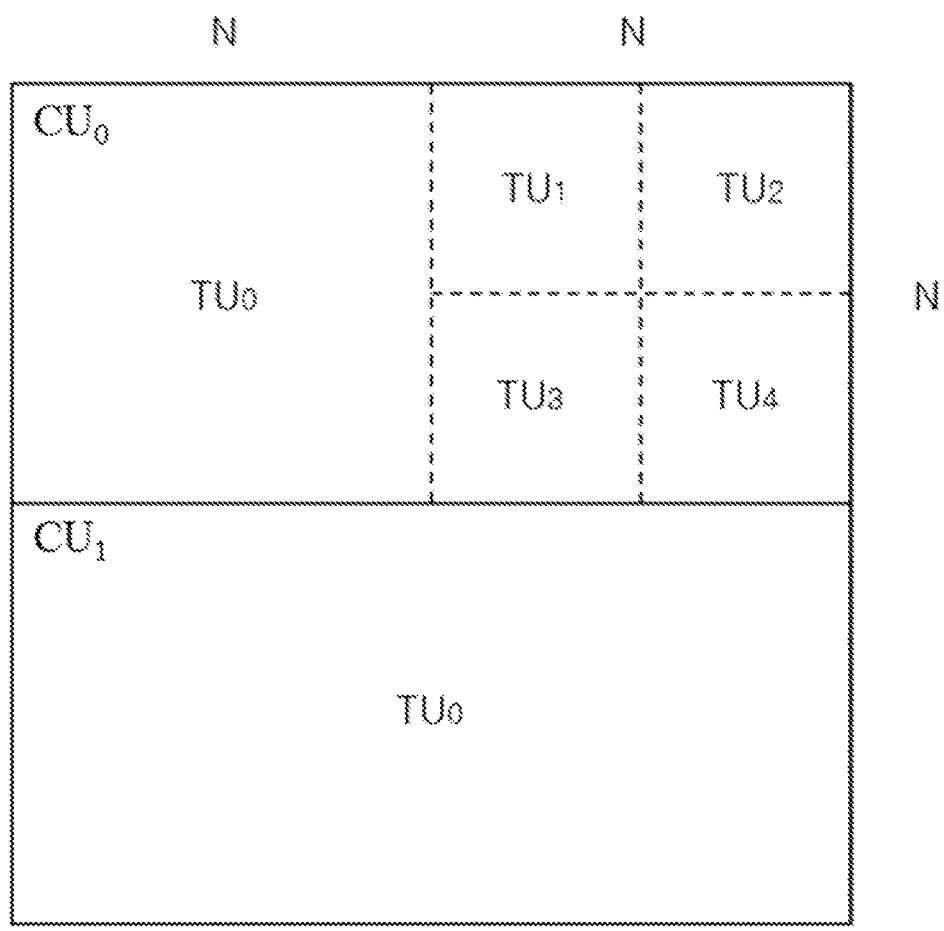

Referring to FIG. 16, the rectangular coding block CB0 having a size of 2N×N is divided into a binary tree structure, the block having the size of the divided N×N is divided into the quad tree structure again to divide into square transform units TU1, TU2, TU3, TU4 having a size of N/2×N/2.

For the blocks (e.g., the coding unit CU, the prediction unit PU, and the transform unit TU divided, the encoding and decoding operation of the image can be performed by the method as described with reference to FIGS. 11 to 16.

Hereinafter, embodiments of a method in which the encoding apparatus 10 according to the present invention determines a block division structure will be described.

The picture division unit 110 provided in the image encoding apparatus 10 performs rate distortion optimization RDO according to a preset sequence to determine the division structure of the divisible coding unit CU, the prediction unit PU and the transform unit TU as described above.

For example, to determine the block division structure, the picture division unit 110 performs a rate distortion optimization-quantization RDO-Q to determine the optimal block division structure in view of bit rate and distortion.

Figure 17:
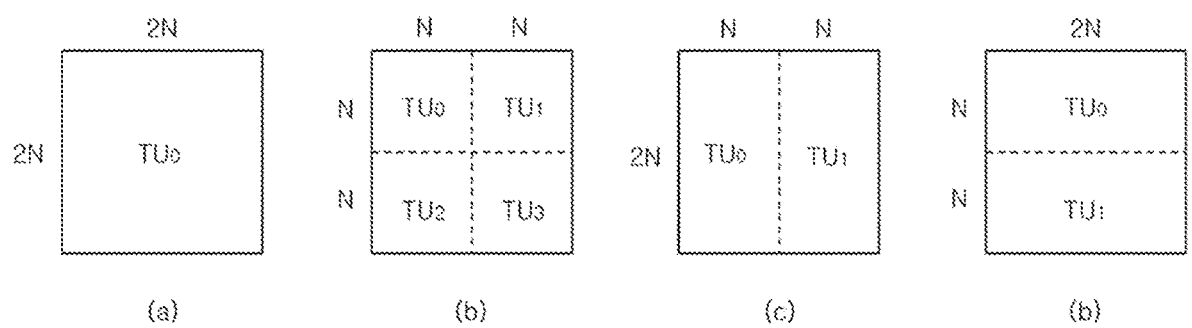
FIGS. 17 and 18 are diagrams for describing embodiments of a method of determining a division structure of a transform unit by performing rate distortion optimization (RDO).

Referring to FIG. 17, when the coding unit CU has a form of 2N×2N pixel size, the RDO is performed the following sequence of division structure of the 2N×2N pixel size shown in FIG. 17 (a), the N×N pixel size shown in FIG. 17 (b), the N×2N pixel size shown in FIG. 17 (c), and the 2N×N pixel size shown in To determine an optimal partition structure of the transform unit PU shown in FIG. 17 (d).

Figure 18:
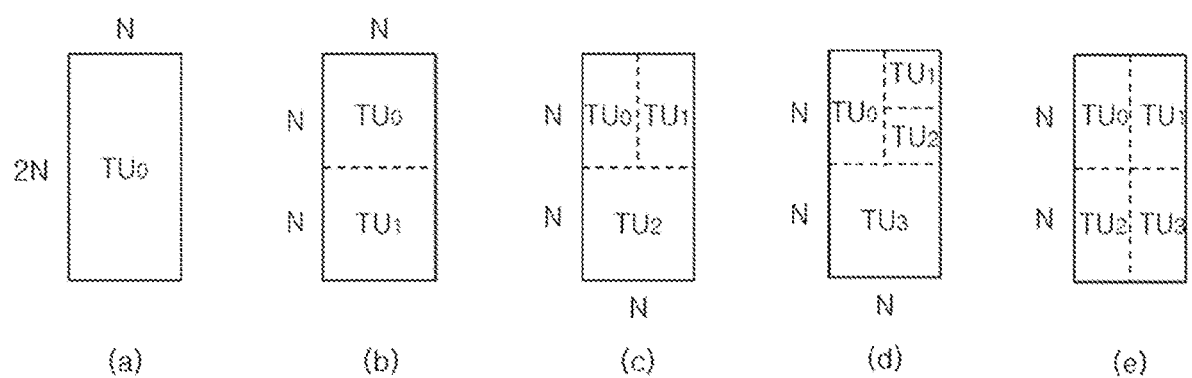

Referring to FIG. 18, when the coding unit CU has the form of N×2N or 2N×N pixel size, the RDO is performed the following sequence of division structure of the N×2N (or 2N×N/2) pixel size shown in FIG. 18(a), the N×N pixel size shown in FIG. 18(b), the N/2×N (or N×N/2) and N×N pixel size shown in FIG. 18(c), the N/2×N/2, N/2×N and N×N pixel size shown in FIG. 18(d), and the N/2×N pixel size shown in FIG. 18(e).

In the above description, the block division method of the present invention has been described by exemplifying that the block division structure is determined by performing rate distortion optimization RDO, the picture division unit 110 determines the block division structure using sum of absolute difference SAD or mean square error MSE, thereby maintaining the efficiency while reducing the complexity.

According to an embodiment of the present invention, it is determined whether adaptive loop filtering ALF is applied in units of the cording unit CU, the prediction unit PU or the transform unit TU as described above.

For example, whether or not the adaptive loop filter ALF is applied can be determined on a coding unit CU basis, the size or coefficient of the loop filter to be applied may vary according to the coding unit CU.

In this case, information indicating whether or not the adaptive loop filter ALF is applied for each coding unit CU may be included in each slice header.

In the case of the color difference signal, it may be determined whether or not the adaptive loop filter ALF is applied, the shape of the loop filter may have a rectangular shape unlike the luminance.

In addition, the adaptive loop filtering ALF may determine whether to apply for each slice, thus, information indicating whether adaptive loop filtering ALF is applied to the current slice may be included in the slice header or the picture header.

If the current slice indicates that adaptive loop filtering is applied, the slice header or picture header may additionally include information indicating the horizontal and/or vertical filter length of the luminance component used in the adaptive loop filtering process.

The slice header or picture header may include information indicating the number of filter sets, if the number of filter sets is two or more, the filter coefficients may be encoded using a prediction method.

Accordingly, the slice header or the picture header may include information indicating whether or not the filter coefficients are encoded in the prediction method, and the predicted filter coefficients is included in the prediction method.

On the other hand, not only luminance but also chrominance components can be adaptively filtered, in this case, information indicating whether each of the color difference components is filtered may be included in the slice header or the picture header, the above information is performed by joint cording. (i.e., multiplexed coding) with information indicating whether to filter for Cr and Cb to reduce the number of bits.

In the case of chrominance components, since Cr and Cb are not all filtered in order to reduce the complexity, if neither Cr nor Cb is filtered, the entropy encoding can be performed by allocating the smallest index.

When both Cr and Cb are filtered, the entropy encoding can be performed by allocating the largest index.

Figure 19:
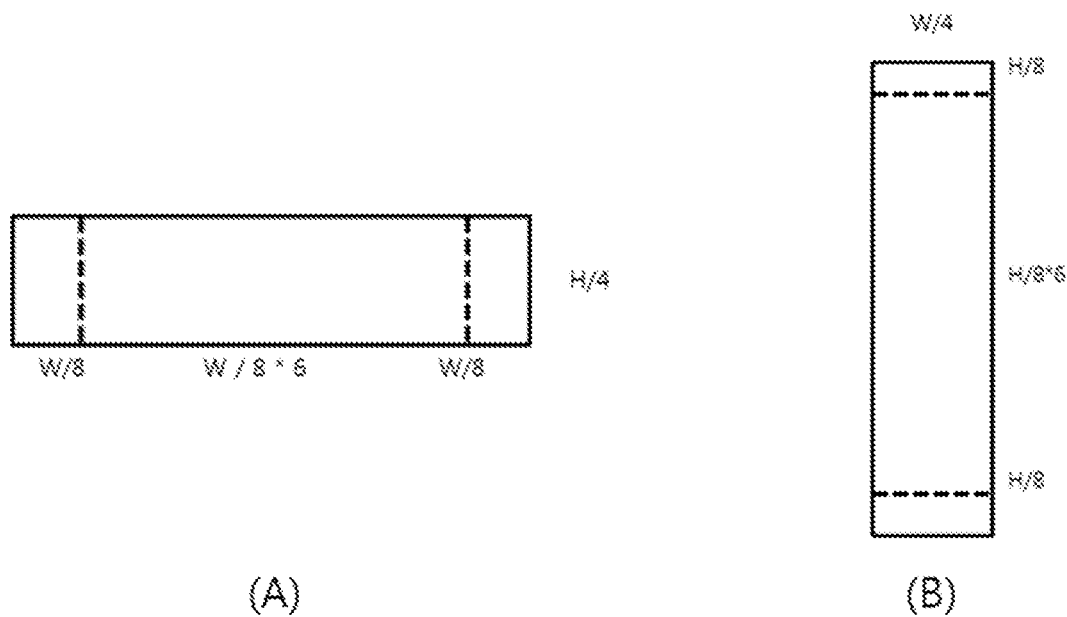
FIG. 19 is a diagram for describing a complex division structure according to another embodiment of the present invention.

FIG. 19 is a diagram for describing a complex division structure according to another embodiment of the present invention.

Referring to FIG. 19, a coding unit (CU) is divided in a binary tree structure. Accordingly, a form of a coding unit (CU) divided into a rectangle of a form having a traverse length W longer than a longitudinal length H, such as FIG. 19(A), and a rectangle of a form having a longitudinal length H longer than a traverse length W, such as FIG. 19(B), may appear. In the case of a coding unit having a length long in a specific direction as described above, there is a good possibility that coding information will be concentrated more on a left and right or top and bottom boundary area than on a middle area.

Accordingly, for more precise and efficient coding and decoding, the coding apparatus 10 according to an embodiment of the present invention may divide a coding unit into a ternary tree or triple tree structure in which the corner area of a coding unit lengthily divided in a specific direction length can be easily divided by quad tree division and binary tree division.

For example, FIG. 19(A) illustrates that if a target coding unit to be divided is a horizontally divided coding unit, the coding unit may be ternary-divided into a first area at a left corner having a length of a width W/8 and a height H/4, a second area that is a middle area having a length of a width W/8*6 and height H/4, and a third area at a right corner having the length of the width W/8 and the height H/4.

Furthermore, FIG. 19(B) illustrates that if a target coding unit to be divided is a vertically divided coding unit, the coding unit may be divided into a first area at a top corner having a length of a width W/4 and a height H/8, a second area that is a middle area having a length of a width W/4 and a height H/8*6, and a third area at a bottom corner having the length of the width W/4 and the height H/8.

Furthermore, the coding apparatus 10 according to an embodiment of the present invention may process the division of such a ternary tree structure through the picture division unit 110. To this end, the picture division unit 110 can determine the division into the quad tree and binary tree structures based on coding efficiency, and can finely determine a subdivided division method by also considering a ternary tree structure.

In this case, the division of the ternary tree structure may be processed on all coding units without being separately limited. However, if coding and decoding efficiency is considered as described above, it may be preferred to allow a ternary tree structure for only a coding unit having a specific condition.

Furthermore, the ternary tree structure may require ternary division using various methods for a coding tree unit, but it may be preferred to allow only a given optimized form by considering a transmission bandwidth based on coding and decoding complexity and signaling.

Accordingly, in determining the division of a current coding unit, the picture division unit 110 may determine whether to divide a current coding unit into a ternary tree structure of a specific form only when the current coding unit corresponds to a preset condition.

Furthermore, if such a ternary tree is allowed, the division ratio of a binary tree may be extended to 3:1 or 1:3 not only 1:1 and varied. Accordingly, the division structure of a coding unit according to an embodiment of the present invention may include a complex tree structure subdivided into a quad tree, a binary tree or a ternary tree based on their ratios.

For example, the picture division unit 110 may determine the complex division structure of a target coding unit to be divided based on a division table.

According to an embodiment of the present invention, the picture division unit 110 may process quad tree division in accordance with a maximum size (e.g., a pixel-based 128× 128 or 256×256) of a block, and may perform complex division processing for processing at least one of a dual tree structure and triple tree structure division corresponding to a quad tree-divided terminal node.

Particularly, the picture division unit 110 according to an embodiment of the present invention may determine any one division structure among first binary division (BINARY 1) that is binary tree division corresponding to the characteristic and size of a current block, second binary division (BINARY 2), and first ternary division (TRI 1) or second ternary division (TRI 2), that is, ternary tree division, based on the division table.

In this case, the first binary division may correspond to vertical or horizontal division having a ratio of N:N. The second binary division may correspond to vertical or horizontal division having a ratio of 3N:N or N:3N. Each root CU that has been binary-divided may be divided into a CU0 and a CU1 each having a size defined in the division table.

Meanwhile, the first ternary division may correspond to vertical or horizontal division having a ratio of N:2N:N. The second ternary division may correspond to vertical or horizontal division having a ratio of N:6N:N. Each root CU that has been ternary-divided may be divided into a CU0, a CU1 and a CU2 each having a size defined in the division table.

Accordingly, the division table indicating each division structure capable of being processed and a coding unit size when a coding unit is divided may be determined in accordance with the size of a target coding unit to be divided.

However, the picture division unit 110 according to an embodiment of the present invention may set a maximum coding unit size and a minimum coding unit size for the first binary division, the second binary division, the first ternary division or the second ternary division.

The reason for this is that to perform coding and decoding processing corresponding to a block having a minimum size, for example, a pixel of 2 or less in height or width may be inefficient from a complexity aspect. Accordingly, in the division table according to an embodiment of the present invention, an allowable division structure for the size of each coding unit may be predefined.

Accordingly, the picture division unit 110 can prevent a case where division is performed in a height or width pixel size of 2 as a minimum size, for example, a size of less than 4. To this end, the picture division unit 110 may determine whether to allow division corresponding to the first binary division, the second binary division, the first ternary division or the second ternary division based on the size of a divided target block, and may determine an optimum division structure by processing and comparing RDO performance computations corresponding to an allowable division structure.

For example, if a root coding unit CU 0 of a maximum size has been binary-divided, the binary division structure may be divided into a CU0 and a CU1 that form any one structure of 1:1, 3:1 or 1:3 vertical division. The ternary division structure may be divided into a CU0, a CU1 and a CU2 that form any one structure of 1:2:1 or 1:6:1 vertical division.

Particularly, an allowable vertical division structure may be limitedly determined based on the size of a target coding unit to be divided. For example, in the case of vertical division structures of a 64×64 coding unit and a 32×32 coding unit, all of the first binary division, the second binary division, the first ternary division and the second ternary division may be allowed. However, the second ternary division of a vertical division structure of a 16×16 coding unit may be limited and impossible. Furthermore, in the case of a vertical division structure of an 8×8 coding unit, only the first binary division may be limitedly allowed. Accordingly, division into a block less than a minimum size that causes complexity can be prevented.

Likewise, if a root coding unit CU 0 of a maximum size has been binary-divided, the binary division structure may be divided into a CU0 and a CU1 that form any one structure of 1:1, 3:1 or 1:3 horizontal division. The ternary division structure may be divided into a CU0, a CU1 and a CU2 that form any one structure of 1:2:1 or 1:6:1 horizontal division.

Likewise, an allowable horizontal division structure may be limitedly determined based on the size of a target coding unit to be divided. For example, in the case of horizontal division structures of a 64×64 coding unit and a 32×32 coding unit, all the first binary division, the second binary division, the first ternary division and the second ternary division may be allowed, but the second ternary division among horizontal division structures of a 16×16 coding unit may be limited and impossible. Furthermore, in the case of a horizontal division structure of an 8×8 coding unit, only the first binary division may be limitedly allowed.

Accordingly, division into a block less than a minimum size that causes complexity can be prevented.

Meanwhile, a division form if horizontal division corresponding to a first vertically-divided coding unit is processed may be illustrated.

In this case, the picture division unit 110 may horizontally divide a vertically divided coding unit into the first binary division or horizontally divide the coding unit into the first ternary division or the second ternary division based on the division table.

For example, in accordance with a coding unit vertically divided as 32×64, the picture division unit 110 may divide the coding unit into a CU0, CU1 of 32×32 based on the first binary division, may divide the coding unit into a C0, CU1 of 32×48, 32×16 based on the second binary division, may divide the coding unit into a CU0, CU1, CU2 of 32×32, 32×16, 32×16 based on the first ternary division, or may divide the coding unit into a CU0, CU1, CU2 of 32×8, 64×48, 32×8 based on the second ternary division.

Furthermore, the picture division unit 110 may vertically divide a horizontally divided coding unit into the first binary division or the second binary division or may vertically divide the coding unit into the first ternary division or the second ternary division.

For example, in accordance with a coding unit horizontally divided as 32×16, the picture division unit 110 may divide the coding unit into a CU0, CU1 of 16×16 based on the first binary division, may divide the coding unit into a C0, CU1 of 24×16 8×16 based on the second binary division, may divide the coding unit into a CU0, CU1, CU2 of 8λ16, 16×16, 8×16 based on the first ternary division, or may divide the coding unit into a CU0, CU1, CU2 of 4×16, 24×16, 4×16 based on the second ternary division.

Such a division allowance structure may be conditionally determined differently based on the size of a CTU, a, CTU group unit and slice unit and for each vertical or horizontal direction. Each CU division ratio and determination size information if the processing of the first binary division, the second binary division, the first ternary division and the second ternary division is performed may be defined by the division table or corresponding condition information may be preset.

Division of a proper ratio suitable for characteristics with respect to a corresponding coding unit is made possible and corresponding coding efficiency can be enhanced because subdivided division using a binary tree and a ternary tree is conditionally allowed based on such division processing.

Figure 20:
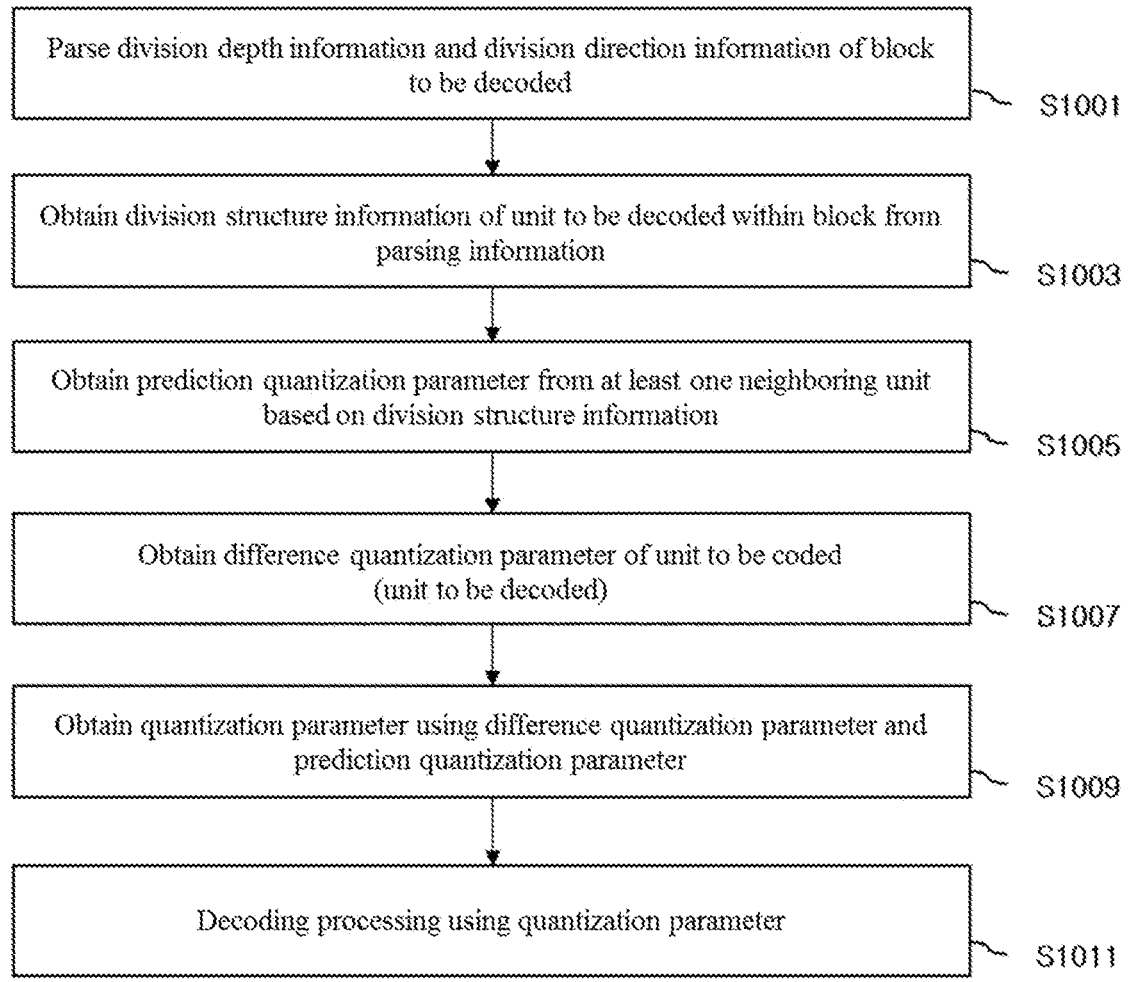
FIG. 20 is a flowchart for describing a quantization processing method according to an embodiment of the present invention.

FIG. 20 is a flowchart for describing an operation of the quantization unit 130 or the dequantization unit 220 according to an embodiment of the present invention.

As described above, the quantization unit 130 may use a quantization step size of a quantization unit neighboring a current quantization unit, as a quantization step size predictor. For example, the quantization unit 130 may perform search in order of a left quantization unit, top quantization unit, and top left quantization unit of a current quantization unit, and may generate a quantization step size predictor of the current quantization unit using one or two valid quantization step sizes. For example, when the quantization step size predictor is determined, the quantization unit 130 transmits a difference value between the quantization step size of the current quantization unit and the quantization step size predictor to the entropy coding unit 140. The dequantization unit 220 may perform processing in reverse order.

Figure 21:
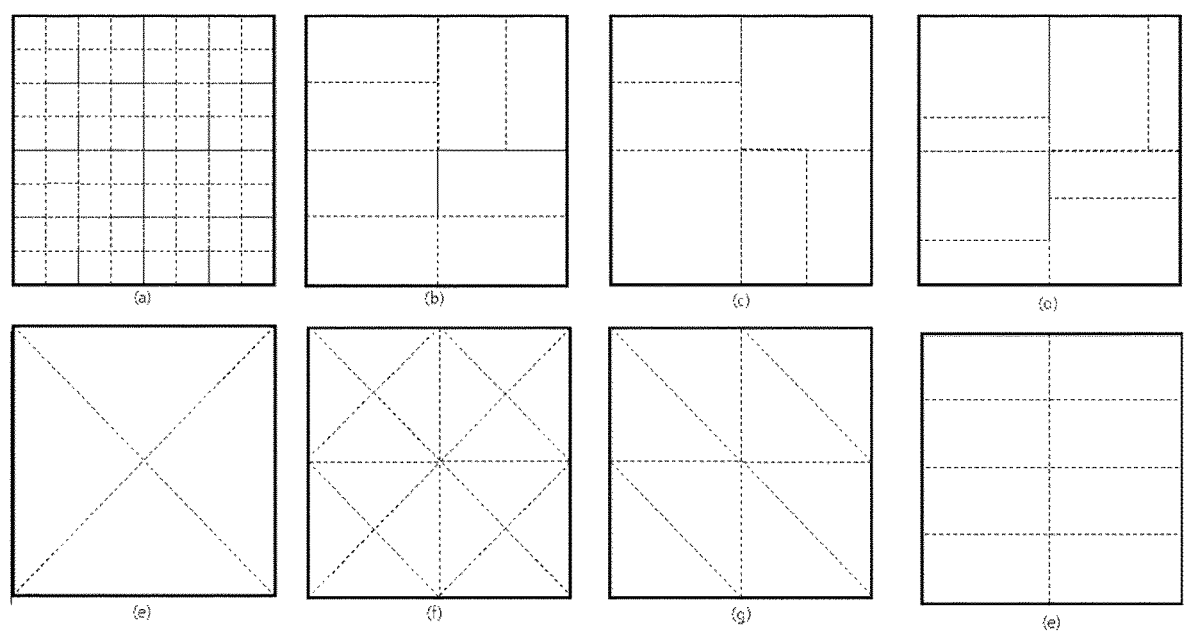
FIG. 21 illustrates division structures having various coding and difference quantization parameter transmission units in an embodiment of the present invention.

However, as shown in FIG. 21, a division structure within each block may be present in more various forms in addition to the binary tree and the ternary tree structure, and a divided shape may appear in a square, rectangle, triangle or given form.

The picture division unit 110 may extract basic division unit information, division depth information and information on whether a block will be divided again in order to find such a division form.

The basic division unit information may indicate information indicating how many blocks are divided from one block. In some embodiments, the basic division unit information may include division unit information indicating that one division is divided into four blocks by transposing and applying two straight lines or one division is divided into two blocks by applying one straight line.

Furthermore, the division depth information may indicate the division number of a block in which division is minimally performed within a block.

Furthermore, the information on whether a block will be divided again may indicate whether the division of a divided block has been halfway stopped without being sufficiently performed by a division number.

For example, if a great block of a 64×64 size has been divided, but all blocks have been divided to a division depth with a basic division unit of 1 and a division depth of 3, the great block will have been divided into a total of 8 rectangles. In this case, the size of a pixel of the rectangle in height and width may be different depending on division direction information.

Accordingly, as shown in FIG. 20, when division depth information and division direction information of a block to be coded or decoded is parsed (S1001), the coding apparatus 100 or the decoding apparatus 200 according to an embodiment of the present invention may obtain division structure information of a unit to be coded or decoded within the block, corresponding to the parsed division depth information and division direction information, through the quantization unit 130 or the dequantization unit 220 (S1003).

Furthermore, the quantization unit 130 or the dequantization unit 220 may obtain one or more prediction quantization parameters from at least one neighboring unit, corresponding to the unit to be coded or decoded, based on the division structure information (S1005), may obtain a difference quantization parameter of the unit to be coded or decoded (S1007), may obtain a quantization parameter based on the difference quantization parameter and the one or more prediction quantization parameters (S1009), and may perform decoding corresponding to the unit to be coded or decoded using the obtained quantization parameter (S1011).

More specifically, in obtain the structure information, the quantization unit 130 or the dequantization unit 220 may obtain the division unit information and division number information of the block to be decoded based on the division depth information and division direction information of the parsed block, and may determine a neighboring unit for predicting a quantization parameter, corresponding to the unit to be decoded, based on at least one of the division depth information, division direction information, division unit information and division number information of the parsed block.

Furthermore, the quantization unit 130 or the dequantization unit 220 may obtain difference quantization parameter depth information corresponding to a separately signaled difference quantization parameter of the unit to be decoded.

In this case, the quantization unit 130 or the dequantization unit 220 may compare the division depth information of the block to be decoded with the difference quantization parameter depth information.

Furthermore, if, as a result of the comparison, the difference quantization parameter depth information is smaller than the division depth information of the block to be decoded, the quantization unit 130 or the dequantization unit 220 may determine the difference quantization parameter depth information as division depth information of the unit to be decoded.

Accordingly, the quantization unit 130 or the dequantization unit 220 may divide the block into the unit to be decoded based on the determined division depth information, and may perform dequantization on the divided unit based on the difference quantization parameter.

Meanwhile, if, as a result of the comparison, the difference quantization parameter depth information is greater than the division depth information of the block to be decoded, the quantization unit 130 or the dequantization unit 220 may obtain additional division direction and additional division unit information for a difference quantization parameter.

In this case, the quantization unit 130 or the dequantization unit 220 may divide the block into the unit to be decoded based on the additional division direction and additional division unit information, and may perform dequantization on the divided unit using the difference quantization parameter.

Figure 22:
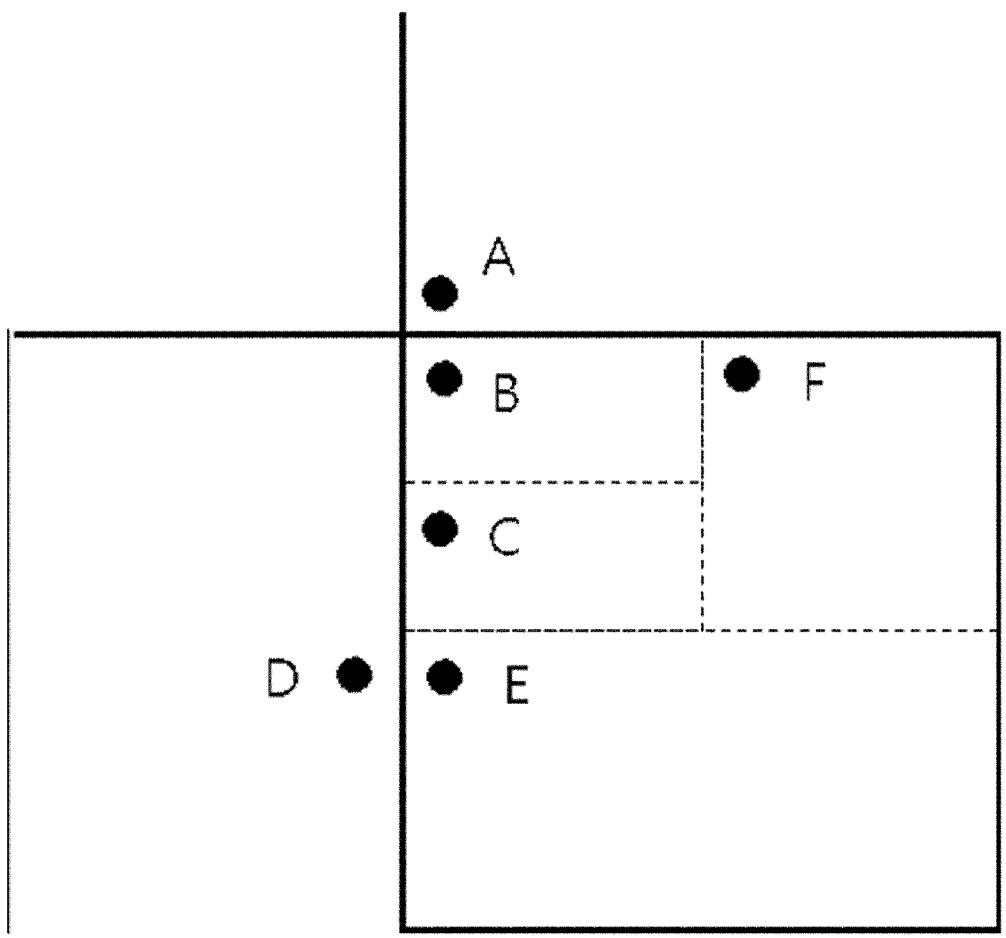
FIG. 22 illustrates a difference quantization parameter prediction method in an embodiment of the present invention.
Figure 23:
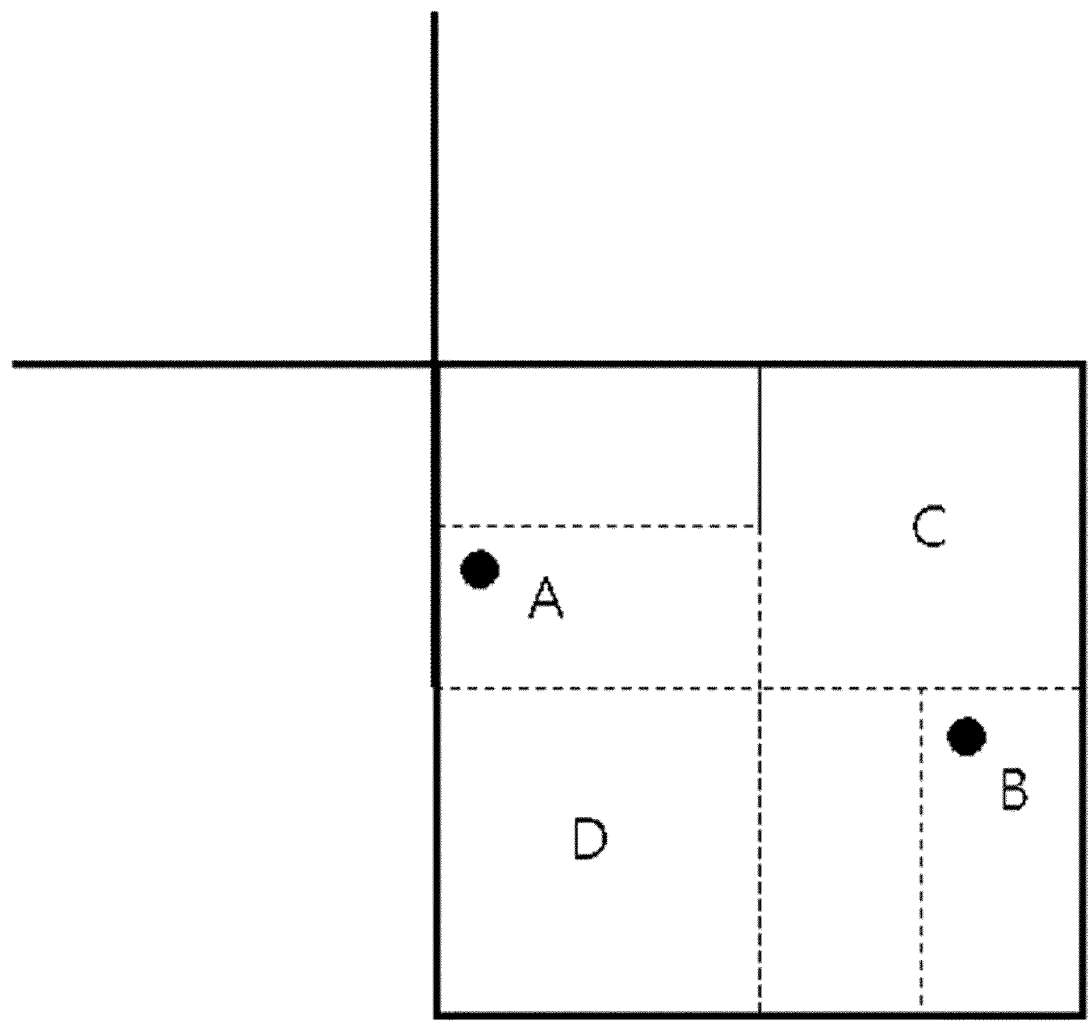
FIG. 23 illustrates a difference quantization parameter prediction method in an embodiment of the present invention.

Such a process is described more specifically through FIGS. 22 and 23.

FIG. 22 illustrates a method of calculating a prediction quantization parameter when the size of a divided unit within a block is different according to an embodiment of the present invention.

As shown in FIG. 22, if a unit within a block has been divided in an unequal size because the quantization unit 130 performs quantization in a divided unit unit, a left or top block may not be present or several blocks may be present.

For example, in FIG. 22, with respect to a unit F, a unit A is present at the top, a unit B is present on the top left, and a unit C is present on the bottom left. In this case, the quantization unit 130 may predict the quantization parameter of the unit F using all block characteristic values A, B, and C.

Furthermore, for example, in FIG. 22, in the case of a unit E, a unit D is present on the left, the unit C is present on the left top, and the unit F is present on the top right. Accordingly, the quantization unit 130 may predict the quantization parameter of the unit E using all block characteristic values D, C, and F.

FIG. 22 is one embodiment for understanding an embodiment of the present invention. More various embodiments are possible.

That is, according to an embodiment of the present invention, the quantization unit 130 may predict a quantization parameter using the block characteristic values of all units neighboring the boundary of the left and top of a unit that is now decoded.

Furthermore, various methods, such as a method of calculating a predicted value through the quantization unit 130, a method using an average of block characteristic values, a method using the smallest value of block characteristic values, and a method using the greatest value of block characteristic values, may be used. This may be performed by a predefined process between the coding apparatus 100 and the decoding apparatus 200. Accordingly, separate signaling may not be necessary, and transmission efficiency can be enhanced.

FIG. 23 is a diagram for describing a method of calculating a prediction quantization parameter based on transmitted difference quantization parameter depth information according to an embodiment of the present invention.

In the embodiment illustrated in FIG. 23, basic division unit information of a coding unit prior to division may include division information for division into two blocks by one straight line. Division depth information of a unit may be 3, and difference quantization parameter depth information may be 2.

In this case, the quantization parameters of a divided unit A and unit B may not be transmitted. The quantization unit 130 may process each unit so that the quantization parameter is computed using the same difference quantization parameter value as the difference quantization parameter of a coding unit prior to division, that is, a one-level higher division unit (block).

In contrast, if division depth information of a unit is 2 and depth information of a difference quantization parameter is 3, units (blocks) C and D need to have two difference quantization parameters. Accordingly, the coding apparatus 100 may transmit depth information, division direction and division unit information to the decoding apparatus 200, and may transmit a characteristic value corresponding to each quantization unit so that a quantization parameter is determined.

In this case, the coding apparatus 100 may include a transmitter for transmitting signaling information for separately signaling depth information for a difference quantization parameter.

Particularly, when depth information corresponding to a difference quantization parameter is the same as block division depth information, the coding apparatus 100 may transmit the difference quantization parameter to the decoding apparatus 200 one by one in accordance with each unit through the transmitter. Accordingly, a bit rate can be improved.

Furthermore, when division depth information is greater than difference quantization parameter depth information, the decoding apparatus 200 process depth information corresponding to a difference quantization parameter so that the depth information has the same value as a difference quantization parameter in the same level.

Furthermore, when division depth information is smaller than difference quantization parameter depth information, the decoding apparatus 200 may divide a unit by a difference quantization depth, may receive a quantization parameter corresponding to the difference quantization depth from the coding apparatus 100. The dequantization unit 220 may process dequantization using the quantization parameter.

The aforementioned division depth information may be processed by the transmission of a difference quantization parameter. The dequantization unit 220 of the decoding apparatus 200 can perform conditional dequantization processing based on the transmission of the difference quantization parameter in a unit unit. Accordingly, transmission efficiency of a quantization parameter can be improved, and precise rate control is made possible.

The method according to the present invention may be implemented as a program for execution on a computer and stored in a computer-readable recording medium. Examples of the computer-readable recording medium include a ROM, a RAM, a CD-ROM, a magnetic tape, a floppy disk, and an optical data storage device, and may also be implemented in the form of a carrier wave (e.g., transmission through the Internet).

The computer-readable recording medium may be distributed to computer systems connected over a network so that computer-readable code can be stored and executed in a distributed manner. Furthermore, functional programs, codes, and code segments for implementing the above method may be easily inferred by programmers of the technical field to which the present invention belongs.

Furthermore, while the present invention has been particularly shown and described with reference to exemplary embodiments thereof, it is to be understood that the invention is not limited to the disclosed exemplary embodiments, but, on the contrary, It will be understood by those skilled in the art that various changes and modifications may be made without departing from the spirit and scope of the present invention.

The invention claimed is:

1. An image decoding method, comprising:
   parsing division depth information and division direction information of a block to be decoded;
   obtaining division structure information of a unit to be decoded within the block corresponding to the parsed division depth information and division direction information;
   obtaining one or more prediction quantization parameters from at least one neighboring unit corresponding to the unit to be decoded based on the division structure information;
   obtaining a difference quantization parameter of the unit to be decoded;
   obtaining a quantization parameter from the difference quantization parameter and the one or more prediction quantization parameters, and
   performing decoding corresponding to the unit to be decoded using the obtained quantization parameter,
   wherein the division structure information comprises a first complex tree structure information or a second complex tree structure information, which have differently set conditional limitations of divisions for the unit to be decoded,
   wherein the conditional limitations comprise at least one of a limitation condition of horizontal binary division, a limitation condition of horizontal ternary division, a limitation condition of vertical binary division and a limitation condition of vertical ternary division, and the conditional limitations allow conditional division of the unit according to the depth information or a size of the unit,
   wherein the obtaining the quantization parameter comprises:
   determining a first quantization parameter when the division structure information comprises the first complex tree structure information; and
   determining a second quantization parameter when the division structure information comprises the second complex tree structure information, and
   wherein a decision process of the first quantization parameter using the first complex tree structure information and a decision process of the second quantization parameter using the second complex tree structure information are different from each other.

2. The image decoding method of claim 1, wherein obtaining the structure information comprises obtaining division unit information and number of divisions performed information of the block to be decoded based on the division depth information and the division direction information of the parsed block.

3. The image decoding method of claim 1, further comprising determining a neighboring unit for predicting the quantization parameter corresponding to the unit to be decoded based on at least one of the division depth information, the division direction information, division unit information and number of divisions performed information of the parsed block.

4. The image decoding method of claim 1, wherein parsing the division depth information and division direction information comprises obtaining difference quantization parameter depth information corresponding to the difference quantization parameter of the unit to be decoded.

5. The image decoding method of claim 4, further comprising comparing the division depth information of the block to be decoded with the difference quantization parameter depth information.

6. The image decoding method of claim 5, wherein if, as a result of the comparison, the difference quantization parameter depth information is smaller than the division depth information of the block to be decoded, the difference quantization parameter depth information is determined as division depth information of the unit to be decoded.

7. The image decoding method of claim 6, further comprising:
   dividing the block into units to be decoded based on the determined division depth information, and
   performing dequantization on the divided units using the difference quantization parameter.

8. The image decoding method of claim 5, further comprising:
   obtaining additional division direction and additional division unit information for the difference quantization parameter if, as a result of the comparison, the difference quantization parameter depth information is greater than the division depth information of the block to be decoded; and
   dividing the block into units to be decoded using the additional division direction and additional division unit information; and
   performing dequantization on the divided units using the difference quantization parameter.

9. An image coding method comprising:
   parsing division depth information and division direction information of a block to be coded;
   obtaining division structure information of a unit to be coded within the block corresponding to the parsed division depth information and division direction information;
   obtaining one or more prediction quantization parameters from at least one neighboring unit corresponding to the unit to be coded based on the division structure information;
   obtaining difference quantization parameter of the unit to be coded;
   obtaining a quantization parameter from the difference quantization parameter and the one or more prediction quantization parameters; and performing coding corresponding to the unit to be coded using the obtained quantization parameter, wherein the division structure information comprises a first complex tree structure information or a second complex tree structure information, which have differently set conditional limitations of divisions for the unit to be decoded, wherein the conditional limitations comprise at least one of a limitation condition of horizontal binary division, a limitation condition of horizontal ternary division, a limitation condition of vertical binary division and a limitation condition of vertical ternary division, and the conditional limitations allow conditional division of the unit according to the depth information or a size of the unit, wherein the obtaining the quantization parameter comprises:

determining a first quantization parameter when the division structure information comprises the first complex tree structure information; and determining a second quantization parameter when the division structure information comprises the second complex tree structure information, and wherein a decision process of the first quantization parameter using the first complex tree structure information and a decision process of the second quantization parameter using the second complex tree structure information are different from each other.

10. An image decoding apparatus comprising:

an entropy decoding unit for parsing division depth information and division direction information of a block to be decoded and obtaining division structure information of a unit to be decoded within the block corresponding to the parsed division depth information and division direction information; and a dequantization unit for obtaining one or more prediction quantization parameters from at least one neighboring unit corresponding to the unit to be decoded based on the division structure information, obtaining a difference quantization parameter of the unit to be decoded, obtaining a quantization parameter from the difference quantization parameter and the one or more prediction quantization parameters, and performing decoding corresponding to the unit to be decoded using the obtained quantization parameter, wherein the division structure information comprises a first complex tree structure information or a second complex tree structure information, which have differently set conditional limitations of divisions for the unit to be decoded, wherein the conditional limitations comprise at least one of a limitation condition of horizontal binary division, a limitation condition of horizontal ternary division, a limitation condition of vertical binary division, and a limitation condition of vertical ternary division, and the conditional limitations allow conditional division of the unit according to the depth information or a size of the unit, wherein the dequantization unit determines a first quantization parameter when the division structure information comprises the first complex tree structure information and determines a second quantization parameter when the division structure information comprises the second complex tree structure information, and wherein a decision process of the first quantization parameter using the first complex tree structure information and a decision process of the second quantization parameter using the second complex tree structure information are different from each other.

* * * * *